(12) United States Patent
Barratt et al.

(10) Patent No.: US 10,115,201 B2
(45) Date of Patent: Oct. 30, 2018

(54) APPARATUS AND METHOD FOR GENERATING AND USING A SUBJECT-SPECIFIC STATISTICAL MOTION MODEL

(71) Applicant: UCL Business PLC, London (GB)

(72) Inventors: Dean Barratt, London (GB); Yipeng Hu, London (GB)

(73) Assignee: UCL Business PLC, London (GB)

( * ) Notice: Subject to any disclaimer, the term of this patent is extended or adjusted under 35 U.S.C. 154(b) by 17 days.

(21) Appl. No.: 15/120,991

(22) PCT Filed: Mar. 3, 2015

(86) PCT No.: PCT/GB2015/050608
§ 371 (c)(1),
(2) Date: Aug. 23, 2016

(87) PCT Pub. No.: WO2015/132575
PCT Pub. Date: Sep. 11, 2015

(65) Prior Publication Data
US 2016/0364880 A1 Dec. 15, 2016

(30) Foreign Application Priority Data

Mar. 4, 2014 (GB) .................................. 1403772.5

(51) Int. Cl.
G06K 9/00 (2006.01)
G06T 7/00 (2017.01)
(Continued)

(52) U.S. Cl.
CPC .......... *G06T 7/0089* (2013.01); *G06K 9/6209* (2013.01); *G06T 7/12* (2017.01);
(Continued)

(58) Field of Classification Search
None
See application file for complete search history.

(56) References Cited

U.S. PATENT DOCUMENTS

2007/0047789 A1* 3/2007 Dewaele ............... G06T 7/0012
382/128
2007/0047790 A1* 3/2007 Dewaele ............... G06K 9/4671
382/128
(Continued)

FOREIGN PATENT DOCUMENTS

EP 2595090 A2 5/2013

OTHER PUBLICATIONS

Yun Zhu et al: "Segmentation of left ventricle from 3D cardiac MR image sequences using a subject-specific dynamical model", Computer Vision and Pattern Recognition, 2008. CVPR 2008. IEEE Conference on, IEEE, Piscataway, NJ, USA, Jun. 23, 2008 (Jun. 23, 2008), pp. 1-8, XP031296991.*
(Continued)

*Primary Examiner* — Hadi Akhavannik
(74) *Attorney, Agent, or Firm* — Park, Vaughan, Fleming & Dowler LLP

(57) ABSTRACT

A method and an apparatus are provided for building a subject-specific statistical model of shape variation for an anatomical structure using a set of geometric representations of shape for the anatomical structure. Each representation is associated with one of multiple subjects, each subject having a respective subset of associated representations, and each subset comprising multiple representations including a reference representation. The multiple representations correspond to different shapes of the anatomical structure arising from physical motion and/or deformation thereof. The method comprises specifying a set of shape parameters whose values, for any given representation, characterize the shape of the representation, and for each subject, representing a probability distribution of the values of the shape parameters across the subset of representations associated
(Continued)

with that subject by a set of subject-specific distribution parameters. The method further comprises determining a regression between the subject-specific distribution parameters and the respective reference representation for each subject, and applying said determined regression to a reference representation for a new subject to determine subject-specific distribution parameters for the new subject. The subject-specific distribution parameters are then used to build a subject-specific statistical motion model for the new subject.

22 Claims, 15 Drawing Sheets

(51) Int. Cl.
*G06K 9/62* (2006.01)
*G06T 7/33* (2017.01)
*G06T 7/12* (2017.01)
*G06T 7/143* (2017.01)
*G06T 7/149* (2017.01)

(52) U.S. Cl.
CPC .............. *G06T 7/143* (2017.01); *G06T 7/149* (2017.01); *G06T 7/344* (2017.01); *G06K 2209/05* (2013.01); *G06K 2209/051* (2013.01); *G06T 2207/10072* (2013.01); *G06T 2207/20081* (2013.01); *G06T 2207/20124* (2013.01); *G06T 2207/30081* (2013.01)

(56) References Cited

U.S. PATENT DOCUMENTS

2010/0067761 A1* 3/2010 Jakobsson ............ G06K 9/6209
                                                        382/131
2010/0128953 A1* 5/2010 Ostrovsky-Berman ......................
                                                        G06T 7/0032
                                                        382/131
2012/0027278 A1* 2/2012 Chaney .................. G06K 9/621
                                                        382/131
2014/0029823 A1 1/2014 Birkbeck et al.

OTHER PUBLICATIONS

Freedman et al.; "Model-Based Segmentation of Medical Imagery by Matching Distributions", IEEE Trans. Med. Imag. vol. 204, No. 3, pp. 281-292, Mar. 2005.
King et al.; "Tracking Liver Motion Using 3-D Ultrasound and a Surface Based Statistical Shape Model" Mathematical Methods in Biomedical.
Samei et al.; "Predicting Liver Motion Using Exemplar Models" Oct. 1, 2012, Abdominal Imaging. Computational and Clinical Applications, Springer Berlin Heidelberg, Berlin Heidelberg, pp. 147-157.
Shi et al.; "Segmenting Lung Fields in Serial Chest Radiographs Using Both Population-Based and Patient-Specific Shape Statistics", IEEE Transactions on Medical Imaging, IEEE Service Center, Piscataway, NJ, US. vol. 27, No. 4, Apr. 1, 2008.
Sotiras et al; "Deformable Medical Image Registration: A Survey" Jan. 7, 2013, vol. 32, pp. 1153-1190.
Zhu et al.; "Segmentation of Left Ventricle From 3D Cardiac MR Image Sequences Using a Subject-Specific Dynamical Model", Computer Vision and Pattern Recognition, 2008. CVPR 2008, IEEE Conference on, IEEE Piscataway, NJ USA, Jun. 23, 2008, pp. 1-8.
International Search Report; dated Sep. 12, 2014, Concept House, South Wales, Joe McCann.
International Search Report and Written Opinion, dated May 12, 2015, European Patent Office, Dana Schalinatus.

* cited by examiner

APPARATUS AND METHOD FOR GENERATING AND USING A SUBJECT-SPECIFIC STATISTICAL MOTION MODEL

FIELD OF THE INVENTION

The present application relates to a method and apparatus for generating and using a subject-specific statistical motion model, such as may be used in the processing of medical images.

BACKGROUND OF THE INVENTION

Statistical shape modelling provides a powerful method to describe and compensate for physical organ shape changes, for example, due to inter-subject anatomical variation, and has been investigated extensively for a range of medical image analysis tasks, including image segmentation [1] and image registration [2]. In particular, the method originally proposed by Cootes et al. [3] in which a low-dimensional, linear statistical shape model (SSM) is constructed by applying principal component analysis (PCA) to image-based shape training data, has been applied to numerous applications where learnt information on organ shape variation provides a useful constraint or prior information. Such models help to ensure that physically implausible organ shapes are not considered, or are at least penalised, when searching for a solution within a segmentation and registration algorithm.

Variations in the shape of an organ can generally be considered as arising from two sources. The first, termed inter-subject variation, represents differences in organ shape between different people, i.e. from one person to another. Such inter-shape variation naturally arises across a population of individuals. The second, termed intra-subject variation, represents changes in the shape of an organ belonging to one person. Such intra-subject variations can be caused by many different factors, such as a change in posture of the person, natural organ motion (e.g. due to breathing or the beating heart), tissue deformation by the insertion of a medical instrument, the progression or regression of a disease, etc.

The most common use of SSMs has generally been in describing inter-subject organ shape variation within a population, where intra-subject shape variation is not explicitly considered, and where training data is acquired in a consistent way to try to ensure that the contribution of any intra-patient shape variation is minimised. SSMs that represent intra-subject organ motion may be termed statistical motion models (SMMs) to distinguish them from the more general SSM [6, 7]. One reason for this focus on inter-subject variation is that modelling subject-specific (intra-subject) organ shape variation and organ motion requires sufficient training data from an individual subject to describe statistically the range of shape variation this is difficult in practice, for example because it may require dynamic imaging data, which may be difficult or impossible to acquire, particularly if the full three-dimensional (3D) variation in organ shape is considered [1]. Particularly challenging examples include modelling non-physiological organ motion due to the intrusion or application of surgical instruments; in such circumstances, it is usually impractical and/or unethical to acquire data on organ shape changes in advance of a surgical procedure.

One approach to address this problem is to simulate organ motion using biomechanical modelling to provide synthetic training data for building a SSM [4, 5]. However, generating synthetic training data in this way is a complex and potentially time-consuming process that requires segmentation of the organ(s) of interest and computationally-intensive simulations using finite element analysis or an equivalent method. These factors place constraints on the way in which such models may be used for practical applications; for example, SMM generation using this approach is only practical as a pre-operative step in image-guided surgery applications when time is available for performing the necessary image analysis and simulations.

It is possible to build a population-based SSM using training data that is subject to both inter- and intra-subject organ shape variation, but such models are very likely to perform less effectively or efficiently compared with a subject-specific SMM for approximating subject-specific shape/motion. In particular, such models usually require additional constraints, such as that provided by an elastic model [8], to distinguish between intra- versus inter-subject variation when using the model to instantiate a shape and to prevent the generation of unrealistic or 'over-generalised' shape instances due to inter-subject shape variation.

The importance of distinguishing inter- and intra-subject shape variation is illustrated by considering the following: if we have first and second organ states, which each corresponds to a different organ shape that arises from intra-subject organ shape variation, then there must be some physical transition of the organ between the first and second states to produce the change in organ shape. A model of such intra-subject variation can be referred to as a SMM (statistical motion model), since the physical transition implies a motion in a general sense (including a shape change due to organ deformation) between the first and second shapes. In contrast, if the differences between the first and second organ shapes arise from inter-subject variation, then they correspond to different individuals, and there is no reason for such a physical transition to exist between the first and second shapes corresponding to some change in state. Accordingly, this type of variation is represented by a more generic SSM (statistic shape model), since the first and second shapes are not generally related to one another by motion.

If an SSM, based at least in part on inter-subject training data, is used to model subject-specific shape variations, it may permit a variation that is not, in fact, physically plausible for a given organ. As an example, it is generally possible for a human to alter the distance from the eye-line down to the lips (by movement of the lips using facial muscles); however, it is not usually possible to alter the distance or separation between the eyes, since this is determined by the (rigid) skull. On the other hand, the separation between the eyes (in effect, the skull size) does vary from one individual to another. Accordingly, an SSM which is based on at least in part on inter-subject training data might potentially allow variation in this eye separation, despite the fact that such variation is not physically plausible in the context of an individual subject.

Recently, multilinear analysis [9] has been proposed as a method for dynamic modelling of the heart [10] and cardiac valve [11] motion. This approach enables inter-subject shape variations (e.g., due to subject specific differences in the size and shape of the heart of different individuals) and intra-subject shape variations (e.g. due to physiological heart motion) to be represented by the same statistical model. However, this method requires that inter-subject temporal correspondence between motion subspaces is known—in other words, the states of the organs for different subjects must be correlated, for example, via an independent signal, such as an electrocardiographic (ECG) signal, which measures the electrical activity of the heart and is therefore is inherently correlated to its motion. Such an independent signal is very difficult to establish for organs other than the heart and lungs, i.e. for organs where a physiological signal related to motion is not available is or very difficult to measure. Furthermore, the cardiac models described in [10, 11] have demonstrated only the ability to predict organ shape at relatively few time-points from the dynamic data available over the remainder of the cardiac cycle.

In general, subject-specific dynamic data on organ motion, for example, from imaging, is often extremely limited or not available at all, but many examples exist in the context of image-guided surgical procedures where it is desirable to be able provide models which use learnt information on inter- and intra-subject organ shape variation to predict subject-specific organ shape and motion given only sparse and potentially noisy (intraoperative) spatial data that describe the current organ state.

For example, in a surgical intervention the surgeon may wish to treat or remove a particular anatomical structure or region of diseased tissue which has a specific location determined in advance of the procedure by pre-operative imaging, such as magnetic resonance imaging (MRI). However, this structure or region may be difficult to localise or not be visible using intraoperative imaging, such as ultrasound, during the procedure. Such intraoperative imaging techniques are typically low-cost, portable, and easier to utilise within a surgical procedure, but often do not provide the information of diagnostic-quality pre-operative imaging methods.

One well-established way of overcoming this difficulty is to perform a (non-rigid) registration (i.e. spatial alignment) between the pre-operative image and the intraoperative image, thereby allowing structures determined in the pre-operative images to be mapped across to (and displayed in conjunction with) the intra-operative images. In practice, this is achieved using special-purpose image fusion software, and an important requirement for surgical applications is that the image registration needs to be performed within a timescale that is acceptable in the context of the surgical procedure. To achieve a high enough accuracy to be of most clinical use, the image registration should also be able to compensate for movement and deformation in the organ or structures of surgical interest, for example, due to changes in the subject position or posture, or as a direct result of instruments used in the surgical procedure itself (for example, organ deformation arising from ultrasound imaging probe pressure). The physical nature of this organ motion in an individual subject suggests that an SMM approach is appropriate, but for cases where dynamic imaging is unavailable, generating a subject-specific SMM by performing biomechanical simulations of organ motion to provide training data is both a complex and time-consuming process, both computationally and from the point of view of implementing within a clinical workflow.

SUMMARY OF THE INVENTION

The invention is defined in the appended claims.

The approach described herein enables a subject-specific SMM to be built without knowing the correspondence between subject subspaces in other words, a relationship between the shapes and states of the organs of different subjects does not need to be established. In addition, this approach involves only limited subject-specific geometric data, for example, a reference shape based on the segmentation of one static image, to predict the organ motion for a new (unseen) subject. The application of this approach for deformable registration of MRI and transrectal ultrasound (TRUS) images of the prostate is discussed below.

More generally, a new framework for statistical shape modelling of subject-specific organ motion, including soft-tissue organ deformation, etc. is described herein. The approach adopted combines modelling of subject-specific probability of shape model parameters with kernel regression analysis to predict organ motion for an unseen subject. The approach is computationally efficient, uses only a limited number of training shape samples for each subject, and is highly suited to image analysis problems where prior subject-specific information on organ shape variation is useful, but where obtaining sufficient training data to construct a statistical shape/motion model for each new subject is impractical or technically or logistically difficult. As an investigation of the approach disclosed herein, subject-specific, MRI-derived statistical prostate motion models are generated and compared with models built using subject-specific training data provided by finite element simulations and mixed subject data that exhibits variation in shape due inter-subject variations and intra-subject prostate motion. The results from this investigation show that the two subject-specific models are generally equivalent in terms of output, and provide much higher specificity than can be obtained with a mixed model built using training datasets from a group of subjects. Furthermore, when used to constrain allowable deformations as part of non-rigid registration algorithm, there was no significant difference in the MRI-to-3D-TRUS target registration error calculated using the two different subject-specific models. These findings indicate that the approach described herein provides a robust, computationally efficient, and practical alternative to subject-specific statistical shape models of organ motion based on simulations, and, potentially, to dynamic imaging.

Some embodiments of the invention provide a method and an apparatus for building a subject-specific statistical model of shape variation for an anatomical structure using a set of geometric representations of shape for the anatomical structure. Each representation is associated with one of multiple subjects, each subject having a respective subset of associated representations, and each subset comprising multiple representations including a reference representation. The multiple representations correspond to different shapes of the anatomical structure arising from physical motion and/or deformation thereof. The method comprises specifying a set of shape parameters whose values, for any given representation, characterise the shape of the representation, and for each subject, representing a probability distribution of the values of the shape parameters across the subset of representations associated with that subject by a set of subject-specific distribution parameters. The method further comprises determining a regression between the subject-specific distribution parameters and the respective reference representation for each subject, and applying said determined regression to a reference representation for a new subject to determine subject-specific distribution parameters for the new subject. The subject-specific distribution parameters are then used to build a subject-specific statistical motion model for the new subject.

The geometric representations may, for example, comprise images. The images may be three-dimensional, especially for representing the three-dimensional shape of the anatomical structure. The images may also be two dimensional; this may be appropriate, for example, in a facial recognition systems. The images may be obtained from one or more suitable imaging modalities, such as (without limitation) magnetic resonance imaging (MRI), X-ray computed tomography (CT), positron emission tomography (PET), ultrasound, photo-acoustic imaging (PAT), optical, X-ray or gamma ray imaging, optical microscopy, electron microscopy, etc.

The geometric representations may also be derived, for example, from biomechanical modelling. Thus the shape of an anatomical structure for a subject might initially be determined by measurement (whether from an image, or by any other appropriate physical measurement technique), and a model fitted to this shape based on known properties of the materials of the anatomical structure, such as elasticity, etc. The model allows the anatomical structure to move or deform in accordance with these known properties, thereby creating other physically realistic shapes for the anatomical structure. Representations of these shapes, in effect, instances of the model corresponding to different locations across the parameter space of the model, can be utilised to provide the geometric representations of shape for the anatomical structure. Such geometric representations can be provided in any appropriate format, for example, as an image generated from the model, or as a set of positions of particular features or landmarks on the anatomical structure according to the configuration of that particular model instance.

The geometrical representations may be derived from a combination of sources, for example, from multiple different imaging modalities, and/or from biomechanical modelling.

In some embodiments, the set of shape parameters are determined using principal component analysis (PCA), which provides a compact representation of the domain or space of the geometric representations. However, other embodiments may utilise different shape parameters. For example, if the representations are derived from biomechanical modelling, then the shape parameters might potentially be derived directly from (or correspond to) the values of certain model parameters.

A wide range of anatomical structures can be modelled using the approach described herein. For example, the anatomical structure may represent an organ, such as the prostate, liver, kidney or heart, comprising soft tissue. Modelling of such organs is typically performed for medical reasons. For example, the modelling may support a non-rigid image registration, which allows a first image to be mapped (registered) to a second image. The first image might be a detailed pre-operative image, such as acquired via MRI, and the second image might be an intra-operative image, such as acquired via ultrasound. The modelling described herein can help the non-rigid image registration to accommodate, in a computationally efficient manner, deformation or motion of the organ, such as may arise from a change in posture of the subject, the presence of a surgical instrument, some change in physiological state, and/or any other source of deformation. The modelling described herein can also be utilised for non-medical purposes, such as facial recognition.

BRIEF DESCRIPTION OF THE DRAWINGS

Various embodiments of the invention will now be described in detail by way of example only with reference to the following drawings.

DETAILED DESCRIPTION

The approach described herein recognises that variations in organ shape due to motion can be expressed with respect to a 'mixed-subject' (i.e. population-based) SSM built using training data from multiple subjects and multiple shapes for each subject. The resulting SSM captures shape variation both between and within individuals. Kernel regression analysis then provides a method to express the multivariate subject-specific probability density function (SSPDF), which represents the distribution of shape parameters (also known as component scores or weights) related to intra-subject organ motion, as a function of the parameters of a pre-chosen reference shape. Once this relationship has been established, the SSPDF that describes the expected organ motion for a new (i.e. unseen) subject can be estimated from new reference shape data for that subject. The resulting SSPDF can then be used to construct a subject-specific SMM for the new subject.

Figure 1:
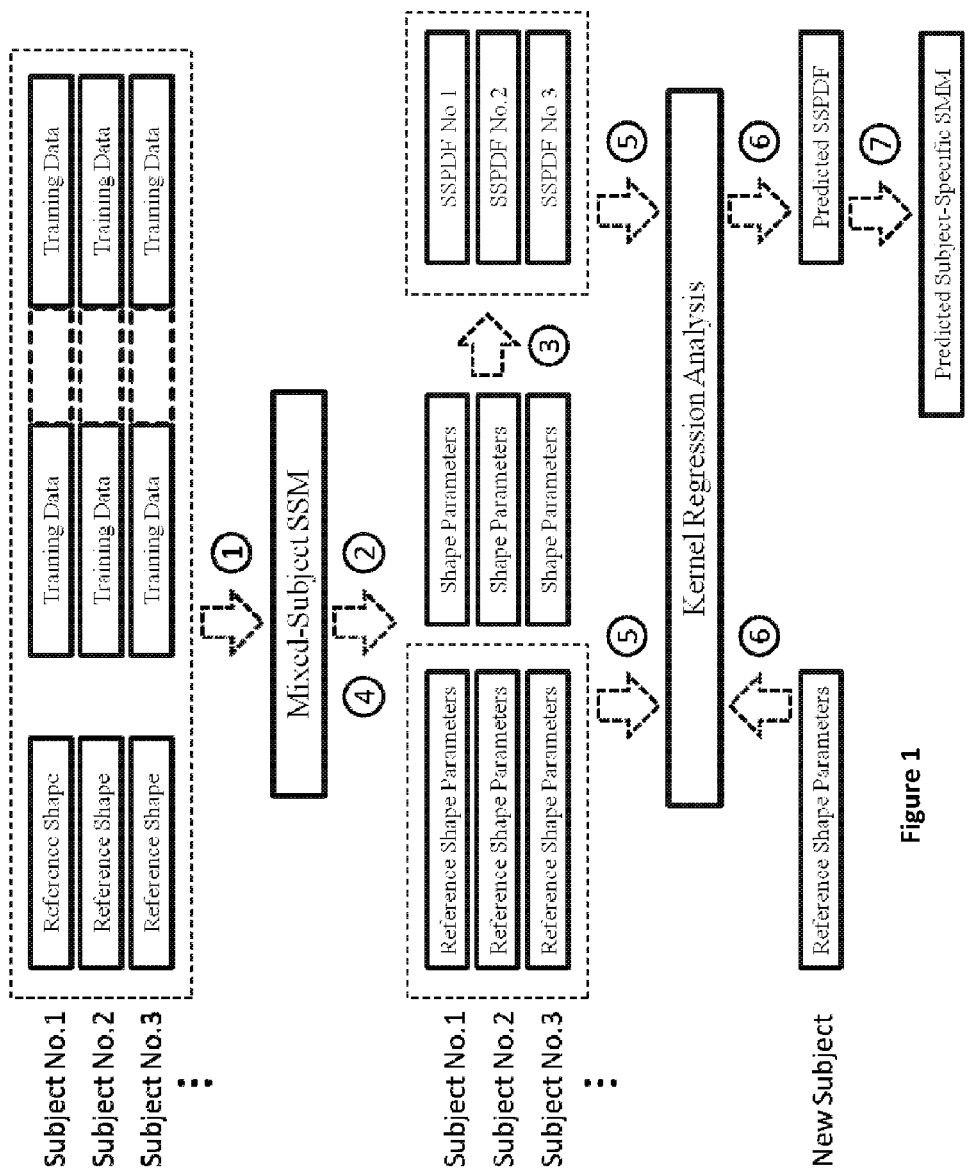
FIG. 1 is a schematic overview of the method used to build a subject-specific SMM in accordance with some embodiments of the invention.

A schematic overview of the method used to build a subject-specific SMM is shown in FIG. 1. The stages involved are as follows:

1. Build the mixed-subject SSM using all available training data;
2. Obtain the shape parameters for each training dataset with respect to the mixed-subject SSM (e.g. by projection for the case of a linear model);
3. Estimate the SSPDF for each set of shape parameters corresponding to the different training shapes for each subject. The SSPDF may itself be expressed in parametric form and represented by a number of distribution parameters—e.g. the mean and variance for a Gaussian distribution;
4. Identify a reference shape for each subject. For example, the reference shape may describe an organ in its 'resting', un-deformed state, or at a time corresponding to a particular physiological event. The reference shape is then represented by its shape parameters;
5. For each subject, perform kernel regression analysis between the parameters that characterise each SSPDF and the shape parameters that specify the reference shape;
6. Given the reference shape for a new subject, predict the SSPDF for the new subject using regression analysis;
7. Finally, construct a subject-specific SMM for the new subject by using the predicted SSPDF.

The main steps described above are also illustrated in FIG. 1. The resulting subject-specific SMM is an alternative to a subject-specific SMM built directly from training data available for this subject (including image-based and simulated training data). Therefore, the subject-specific SMM estimated using this method can be compared directly with one generated using the conventional method. In the following description, an illustration of implementing these steps is provided using the example of building a subject-specific SMM of the prostate that captures deformation caused by the placement of an ultrasound probe in the rectum.

Construction of a Mixed-Subject Statistical Shape Model

Figure 2:
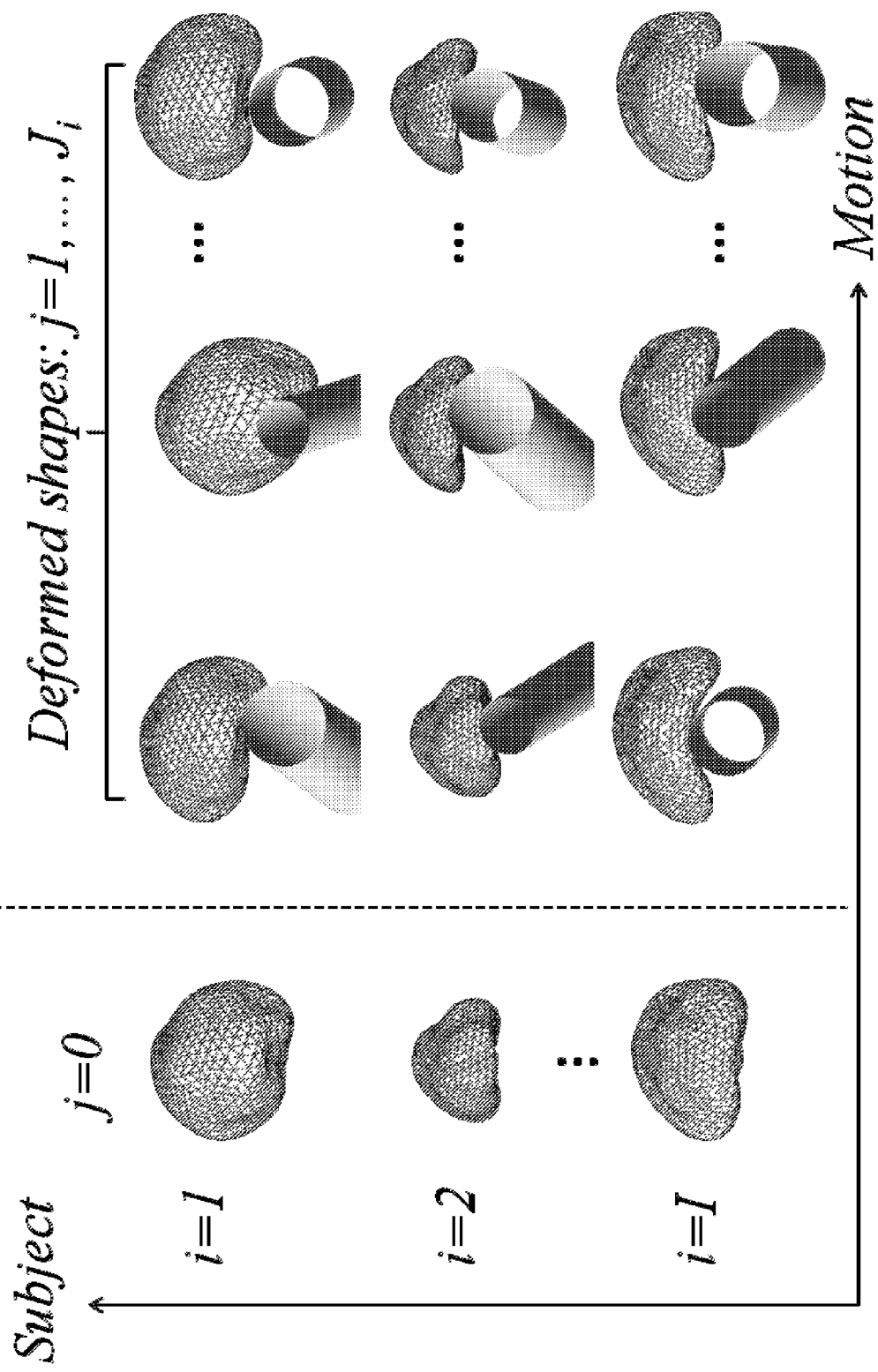
FIG. 2 shows a schematic representation of the shapes of the prostates of different subjects. Each shape was generated using biomechanical modelling software to predict the physical deformation under different conditions.

FIG. 2 shows a schematic representation of the shapes of the prostates of I subjects, as represented by triangulated meshes. In this case, the shape of each mesh has been simulated using finite element (FE) modelling to predict various physical deformations of a reference shape in response to the presence of a transrectal ultrasound (TRUS) probe. The 3D position and orientation of the TRUS probe is represented in FIG. 2 by a shaded hollow cylinder for each deformed shape instance.

Without assuming an equal number of shapes per subject, varying the pose of a transrectal ultrasound (TRUS) probe and the diameter of the water-filled balloon surrounding the probe in each simulation results in $J_i$ (i=1, 2, ..., I) predicted deformed shapes (for subject i). As described in [5, 12], other unknown parameters, such as tissue elastic properties, may also be included as variables in the simulations to reflect uncertainty in these properties. For each subject, the first shape, denoted by j=0, is the reference shape and the remaining $J_i$, i.e. j=1, 2, ... $J_i$, shapes are deformed instances of the reference shape. In this example, the reference shape represents the prostate in the "resting state", obtained by segmenting a T2-weighted MR image that was acquired without an endorectal coil (or other rectal insertion) in place [12]. The reference shapes are usually normalised to a consistent scale and orientation, so as to provide the most reliable comparability between the different images.

In general, group-wise surface registration of the meshes can be performed to establish point correspondence between: (i) each deformed shape and the reference shape for each subject, and ii) the reference shapes of different subjects. Where FE simulations are performed to determine the training dataset, the point correspondence between each deformed shape (and the reference shape) is known implicitly. The algorithm used to determine the cross-subject (inter-subject) point correspondence is described below.

The mixed-subject SSM is constructed by applying principal component analysis (PCA) to $G = I + \sum_{i=1}^{I} J_i$ training shape vectors, $s_g = [x_{g1}, y_{g1}, z_{g1}, x_{g2}, y_{g2}, z_{g2}, \ldots, x_{gN}, y_{gN}, z_{gN}]^T$, g=1, 2, ..., G, where each training shape vector contains the 3D co-ordinates of N points that describe the $g^{th}$ shape. The shape vectors may define either a 3D surface or a volume (for example, represented by the nodes of an FE mesh). Taking advantage of dimensionality reduction by excluding components that explain less variance in the training data, the resulting shape model is approximated by the linear equation using L≤G principal components [3]:

$$s_g = \bar{s} + \sum_{l=1}^{L} b_{gl} e_l = \bar{s} + [e_1, e_2, \ldots, e_L][b_{g1}, b_{g2}, \ldots, b_{gL}]^T = \bar{s} + E b_g \quad (1)$$

where $\bar{s}$ is the mean shape vector; $e_l$ is the eigenvector of the covariance matrix of the (mean-subtracted) training shape vectors corresponding to the $l^{th}$ largest eigenvalue, $\sigma_l^2$; and $b_{gl}$ is a scalar shape parameter; the vector $b_g$ contains the shape parameters that collectively describe the $g^{th}$ organ shape. Eq. (1) models mixed-subject individual and motion variations learned from all the training data. In this model, we can regards $\bar{s}$ and E as estimates, from the overall data set, of distribution parameters that apply to the whole data set, and which are used to transform the shape properties for a given sample between two different coordinate systems—$s_g$, which represents the coordinate system of the raw image data, and $b_g$, which represents a reduced dimension coordinate system from the PCA. An SSM generated in this way is referred to as the mixed-subject SSM.

Subject-Specific PDF Calculation

The subject-specific probability density for the subject is denoted by $P(\mathcal{B}_i : \mathcal{B}_i \in \Omega_i)$, where $\mathcal{B}_i$ is a multivariate random variable and $\Omega_i \in \mathfrak{R}^L$ denotes the $i^{th}$ subject subspace (hence the vector shape parameter $b_g$, in respect of subject i, comprises samples from $\mathcal{B}_i$). Rearranging Eq. (1) we have:

$$b_{ij} = E^T(s_{ij} - \bar{s}) \quad (2)$$

In Eq, (2), $b_{ij}$ contains the shape parameters of the training data by projecting the coordinates $s_{ij}$ for the $j^{th}$ shape belonging to the $i^{th}$ subject. Note that both $s_{ij}$ and $s_g$ are training shape vectors, where the different subscripts just denote differently grouped data. $P(\mathcal{B}_i)$ may be simplified by the independence assumption so that this multivariate probability density is expressed as a factorised joint probability density, i.e., $P(\mathcal{B}_i) = \prod_{l=1}^{L} P(B_{il})$, where $\mathcal{B}_i = [B_{il}]_{l=1, 2, \ldots, L}^T$. In other words, the probability distribution along any given axis of the reduced dimension space of $b_{ij}$ is considered to be independent of the values on the remaining axes, hence the overall probability can be derived by multiplying together the separate (individual) probability values for each axis.

(The independence assumption and the multivariate Gaussian assumption, see below, have been discussed extensively in the literature (e.g. see [13])—however, a more complicated distribution, such as a non-unimodal mixture or a full covariance matrix, may be considered when appropriate. In practice, these assumptions reduce the degrees of freedom of the covariance matrix but maintain the modelling generalisation ability as demonstrated in the cross validation).

Figure 3:
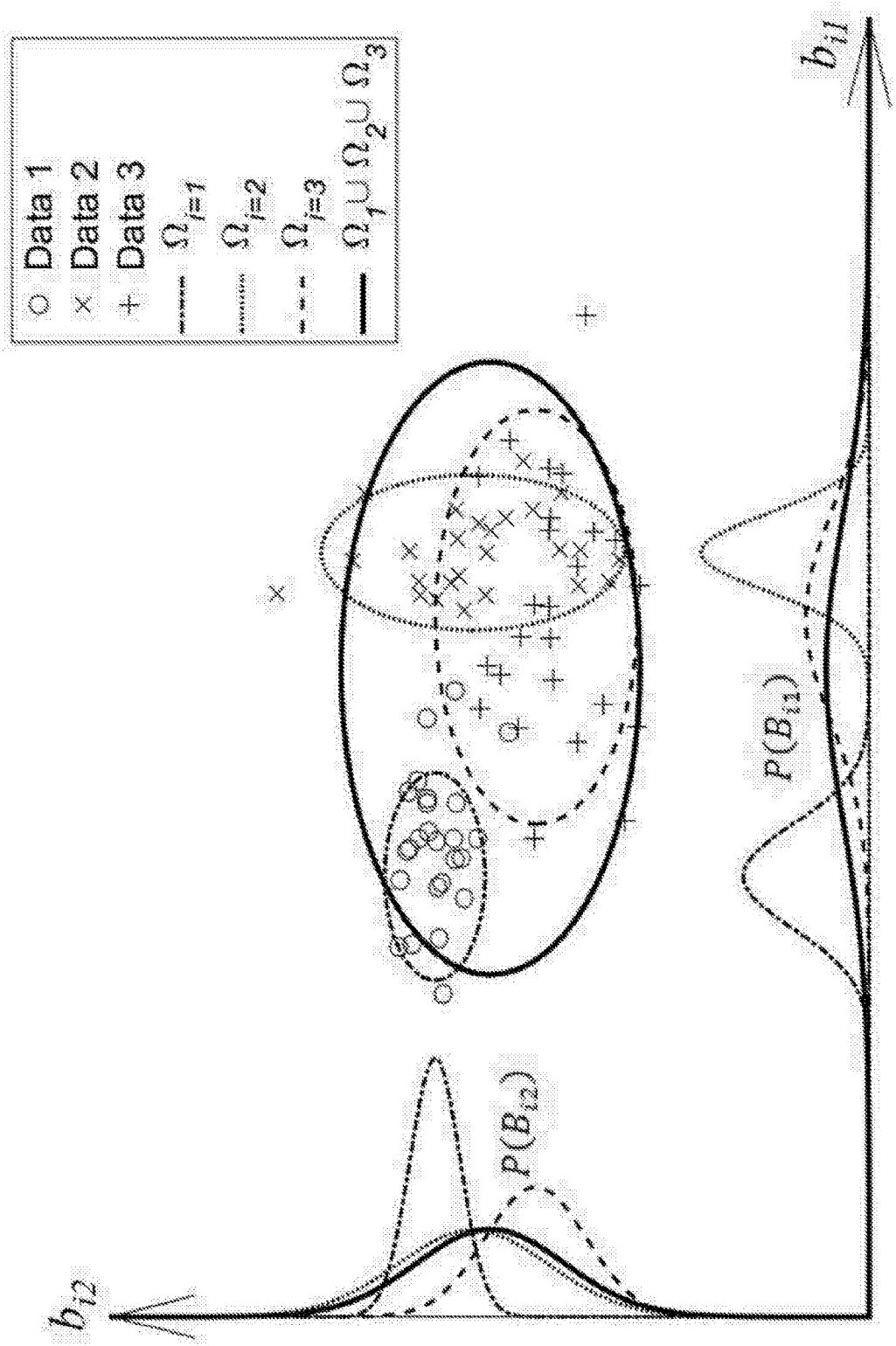
FIG. 3 provides a graphical representation of the factorised probability density $P(B_{ij})$ for three different subjects, as determined by a method in accordance with some embodiments of the invention.

Expressing the probability in this way using the independence assumption enables us to draw an informative plot of the distribution in terms of individual distributions of the scalar random variable $B_{il}$ for $l^{th}$ shape parameter (corresponding to the $l^{th}$ principal component). An example is shown in FIG. 3, which provides a graphical representation of the factorised probability density $P(B_{il})$ for three different subjects, labelled as data 1, data 2 and data 3 (also denoted as $\Omega_i$ where i=1, 2 or 3) and for two principal components of the mixed-subject SSM (corresponding to the x and y axes). The curves shown on each axis represent the factorised probability densities for the respective principal component, whereas the ellipses represent bounding parameter values of the SSPDFs, $P(\mathcal{B}_i)$ based on both principal components. The scalar shape parameters $b_{ijl}$, j=1, 2, ..., $J_i$ are $J_i$ samples of the random variable, $B_{il}$, as derived from the set of $J_i$ deformed shapes for a given subject (i).

Similarly, the probability density of all the training data that builds the mixed-subject SSM is denoted by $P(\mathcal{B}_g$ $\mathcal{B}_g \in \Omega_g)$, where the reference space $\Omega_g$ is the union of all the subject subspaces. This can be factorised in the same way such that $P(\mathcal{B}_g) = \Pi_{l=1}^{L} P(B_{gl})$. In other words, this applies the independence assumption across the entire training data set (rather than just on the training data for an individual subject).

Figure 4:
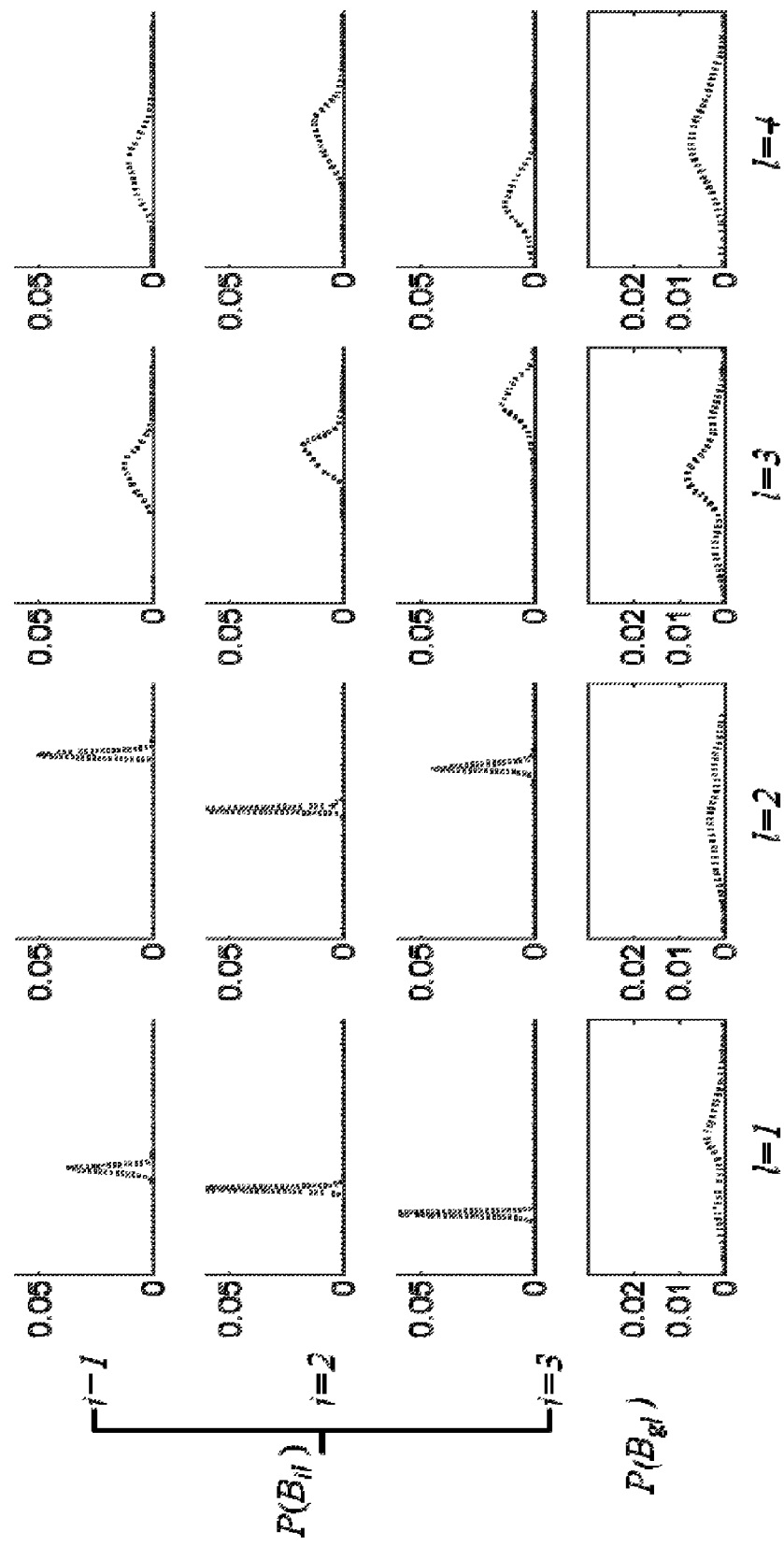
FIG. 4 provides a comparison of the factorised probability density for three subjects, compared with for the population as a whole.

FIG. 4 shows some examples of these factorised probability densities using the histograms of the samples $\{b_{ij}\}$ from the prostate shape data. In particular, FIG. 4 presents examples of estimated factorised probability densities $P(B_{il})$, represented by histograms for the prostate shape data, for three different subjects (i=1, 2, 3), while the bottom row represents the corresponding population probability densities $P(B_{gl})$ computed over the entire training data.

Inspecting the plots in FIG. 4, it is clearly apparent that $P(B_{il})$ is different between subjects (i.e. for different values of (i)), and $P(B_{il})$ is also different from $P(B_{gl})$, corresponding to the mixed-subject (population) SSM. In other words, the population as a whole is used to define the principal components of the data set, but when we then look at the distribution for each principal component, the distributions can be very subject specific. For example, if we consider the distribution for l=1 and 2, it can be seen that the distribution of $P(B_{il})$ is relatively narrow for each subject, whereas the distribution of $P(B_{gl})$ is relatively broad. This may correspond to the example given above of eye separation (albeit that a principal component will generally represent a combination of physical parameters)—in other words, the inter-subject variation for eye separation is relatively broad, but the intra-subject (subject-specific) variation is relatively low. Accordingly, most of the spread in the distribution of $P(B_{gl})$ for l=1 and 2 can be attributed to variations between different individuals, rather than intra-subject variability. In contrast, for l=3 and 4, the distribution of $P(B_{il})$ is relatively broad for each subject. This suggests that intra-subject variability may be an important factor (possibly the most important factor) behind the variability associated with this principal component.

Overall, the approach described herein develops from FIG. 4 a potential mechanism to decompose the whole (population) mixed-subject space into motion- and subject subspaces by modelling the SSPDFs, where the space for (physical) motion corresponds to the intra-subject variation, i.e. transitioning from one physical position of an organ to another physical position in a given subject.

It can also be seen from FIG. 4 that the sample distributions have a generally bell-like shape with different widths and centre positions. Following the independence assumption, the SSPDF may be parameterised by a multivariate Gaussian PDF $\mathcal{N}(\mathcal{B}_i; \mu_i, \sigma_i^2)$, where the distribution parameters, $\mu_i$ and $\sigma_i^2$, represent the mean vector and the diagonal entries of the L×L covariance matrix respectively, and in which the diagonal entries of the covariance matrix represent the component variance vector $\sigma_i^2 = [\sigma_{il}^2]_{l=1, 2, \ldots, L}^T$. This PDF is considered as a parametric example of the SSPDF for $i^{th}$ subject, and is entirely characterised by the distribution parameters $\mu_i$ and $\sigma_i^2$. In other words, for any given subject (as specified by i), the probability distribution associated with a given principal component (as specified by l) approximates to a Gaussian distribution which can be parameterised by two standard scalar quantities, namely mean ($\mu$) and variance ($\sigma^2$).

Parameter Estimation Using Kernel Regression Analysis

The distribution parameters for a given subject (i), namely $\mu_i$ and $\sigma_i^2$, may be estimated given a set of samples $\{b_{ij}, j=1, 2, \ldots, J_i\}$ using the following maximum likelihood estimators:

$$\hat{\mu}_i = \frac{1}{J_i} \sum_{j=1}^{J_i} b_{ij} \qquad (3)$$

$$\hat{\sigma}_i^2 = \frac{1}{J_i - 1} \sum_{j=1}^{J_i} (b_{ij} - \hat{\mu}_i)^2 \qquad (4)$$

Without loss of generality, we now assume that a (non-linear) relationship exists between the distribution parameter $\theta_i = [\hat{\mu}_i^T, \hat{\sigma}_i^T]^T$ of the SSPDF $P(\mathcal{B}_i; \theta_i)$ for a given subject (i) and the shape parameters of reference shape $b_{i0}$ for that same subject. This opens up the possibility of predicting the distribution parameter $\theta_i$, and therefore the SSPDF $P(\mathcal{B}_i)$, for a new subject (e.g. i=I+1), based solely on the shape parameters of the reference shape for the new subject data and the above relationship.

In the current study, the distribution parameter is expressed as a linear function of kernels as follows:

$$\theta_m(b) = \beta_{m0} + \sum_{i=1}^{I} \beta_{mi} K(b, b_{i0}) + \in_m \qquad (5)$$

with the constraint $\sum_{i=1}^{I} |\beta_{mi}|^2 \leq c$. In Eq. (5), $K(x,x') = \exp(-\|x-x'\|^2 / 2h^2)$ is a Gaussian kernel function with kernel parameter h; c is a positive scalar constant; $\in$ is a random noise term with $E[\in]=0$; m is the index of each scalar distribution parameter such that $\theta_i = [\theta_{mi}]_{m=1, 2, \ldots, 2L}$; and $\beta_m = [\beta_{mi}]_{i=0, 1, \ldots, I}^T$ is a vector regression parameter. The optimal regression parameter for a given data set (e.g. for the set of data illustrated in FIG. 2) may be obtained by using a linear least squares technique to minimise the regularised residual sum-of-squares as follows [14]:

First, a regularised estimator $\hat{\beta}_m = [\hat{\beta}_{mi}]_{i=1, 2, \ldots, I}^T$ is given by:

$$\hat{\beta}_m = (\Phi_m^T \Phi_m + \lambda I)^{-1} \Phi_m^T \theta_i \qquad (6)$$

where the design matrix takes the following form:

$$\Phi_m = \begin{bmatrix} K(b_{10}, b_{10}) - \bar{\varphi}_1 & \cdots & K(b_{10}, b_{10}) - \bar{\varphi}_I \\ \vdots & \ddots & \vdots \\ K(b_{I0}, b_{I0}) - \bar{\varphi}_1 & \cdots & K(b_{I0}, b_{I0}) - \bar{\varphi}_I \end{bmatrix} \qquad (7)$$

$$\bar{\varphi}_k = \frac{1}{I} \sum_{k=1}^{I} K(b_{k0}, b_{i0}),$$

$\lambda$ is the ridge weighting parameter, and I is the identity matrix. The offset coefficient is then given by:

$$\hat{\beta}_{m0} = \frac{1}{I}\sum_{i=1}^{I}\theta_{mi} - \sum_{k=1}^{I}\hat{\beta}_{mk}\bar{\varphi}_k \quad (8)$$

In practice, the regularisation parameter λ is set to a small constant to avoid over-fitting while maintaining acceptable residuals; $\lambda=10^{-8}$ was used in the investigated presented in this study. The kernel parameter h is determined by a cross validation method which is described below.

It will be appreciated that although the above analysis is based on kernel regression using Gaussian kernels, any other suitable forms of regression could be used, e.g. non-parametric regression, or using kernels based on higher order polynomials.

Prediction of a Subject-Specific SMM

Given reference shape data for a new subject, the shape parameters $b_{new,0}$ for the new subject can be estimated by first non-rigidly registering to the mean shape of the group-wise registration [1], and then projecting onto the principal components of the mixed-subject SSM after removing the rigid component. Thus:

$$b_{new,0} = E^T(s_{new,0} - \bar{s}) \quad (9)$$

where $s_{new,0}$ is the rigidly-aligned un-deformed shape. Each distribution parameter of a new SSPDF can then be computed by taking the conditional expectation of Eq. (5), as follows:

$$\theta_m(b_{new,0}) = E[\Theta|b_{new,0}] = \beta_{m0} + \sum_{i=1}^{I}\beta_{mi}K(b_{new,0}, b_{i0}) \quad (10)$$

where coefficients $\beta_{mi}^{new}$ are given by Eqs. (6) and (8) and E[•] denotes the statistical expectation. The SSPDF P($\mathcal{B}_{new}$: $\mathcal{B}_{new} \in \Omega_{new}$) for the new subject can now be predicted using the predicted distribution parameters, $\mathcal{N}(\mathcal{B}_{new}; E\mu_{new}, \sigma_{new}^2)$.

Once P($\mathcal{B}_{new}$) has been estimated, the linear model may be obtained directly by "centering" the predicted diagonal covariance matrix, so that the predicted subject-specific SMM takes the form:

$$s_{predict} = \bar{s} + E\mu_{new} + Eb_{new} \quad (11)$$

where the component variance becomes $\sigma_{new}^2$, $\bar{s}+E\mu_{new}$ is equivalent to the mean of the predicted subject-specific SMM and $b_{new}$ represents the new shape parameters.

Optimal Kernel Parameter

For each regression kernel parameter, expressed as $h=10^x$, an optimal value is computed by minimising the cross validation error, defined as the root-mean-square of the regression residuals, as in Eq. (5). The regression error is computed for each data in a leave-one-out scheme by comparing the difference between the ground-truth distribution parameters, computed from the training data via Eqs. (3) and (4), and the predicted distribution parameters, computed from the test data via Eqs. (6) and (8). In this study, a golden search strategy was used to then find the optimal value of x within the predefined interval $1 \le x \le 8$, with the cross validation error serving as the objective function to minimise.

(A Golden Search, also known as a Golden Section Search, represents a standard numerical optimisation algorithm; the theory is described in Kiefer, J. (1953), "Sequential minimax search for a maximum", Proceedings of the American Mathematical Society 4 (3): 502-506, doi: 10.2307/2032161, while an example implementation is described in Press, WH; Teukolsky, S A; Vetterling, W T; Flannery, B P (2007), "Section 10.2. Golden Section Search in One Dimension", Numerical Recipes: The Art of Scientific Computing (3rd ed.), New York: Cambridge University Press, ISBN 978-0-521-88068-8).

Point Correspondence

One of the advantages of the modelling technique described herein is that it does not require a timing or phase correspondence (such as the position in a breathing cycle) to be established between the motion subspaces. Since only the probability densities are modelled to describe the subject motions, and the motion data can be grouped in an arbitrary order in the training dataset, which overcomes a number of practical difficulties. However, point correspondence still needs to be established between subject subspaces. In other words, a set of predefined features (e.g. anatomical landmarks) are specified for an organ (corresponding to the points), and for each image or data set, the positions of these features (points) in the image are determined. This then allows the point correspondence to be determined, i.e. for each point or feature, the (corresponding) position of that feature in each image or data set is determined. This point correspondence may be estimated, for example, by group-wise surface registration [1].

In one study in accordance with certain embodiments of the present invention, inter-subject registration of the training shapes, required to build the mixed-subject SSM, was performed using an iterative group-wise registration scheme based on the landmark-guided coherent point drift (LGCPD) method [15], where anatomical apex and base points of the prostate serve as two known corresponding points to assist the registration in finding realistic point correspondence between gland surfaces. In this scheme, there is pair-wise registration of every segmentation to the mean shape of the registered segmentations, where the mean shape is updated iteratively until convergence. Typically, this took no more than five iterations. In this example, because each deformed shape was generated by simulating a physical deformation of the reference shape, represented by a FE mesh, 3D point correspondence between different motion data for each subject is available automatically. In other words, the inherent correspondence known from FE simulation may be used to establish correspondence within individual subjects, and image-based registrations are used to establish correspondence between different subjects.

Finally, the single pair-wise registration using this same method was performed in order to find the point correspondence between the new reference shape data and the mean shape of the group-wise registration.

Validation Method

1) Data Acquisition—to test the method described above, a subject-specific SMM of an unseen prostate gland was built and compared with an SMM generated directly using biomechanical modelling as described in [12]. The mixed-subject SSM was built using 100 finite-element simulations of TRUS-probe-induced gland deformation for each of 36 patients, leading to 3600 training shapes in total. For each simulation, different probe/balloon positions and orientations, different balloon diameters, and different elastic material properties were applied (further details can be found in [12]. For each of the 36 patients, the reference geometry of the prostate was defined as the shape resulting from a manual segmentation of the capsule in a T2-weighted MR scan (image), performed by an expert clinical observer.

2) Cross-validation—a leave-one-out, cross-validation framework was used to assess the generalisation ability and specificity [16, 17] of three linear models: 1) the model-predicted subject-specific SMM, as predicted from the mixed-subject SSM, using the method described herein; 2) a subject-specific SMM, built using the biomechanical simulation data, and 3) a mixed-subject SSM built using a training dataset that represents both inter- and intra-subject organ shape variation (this third model is by definition not subject-specific).

Figure 5:
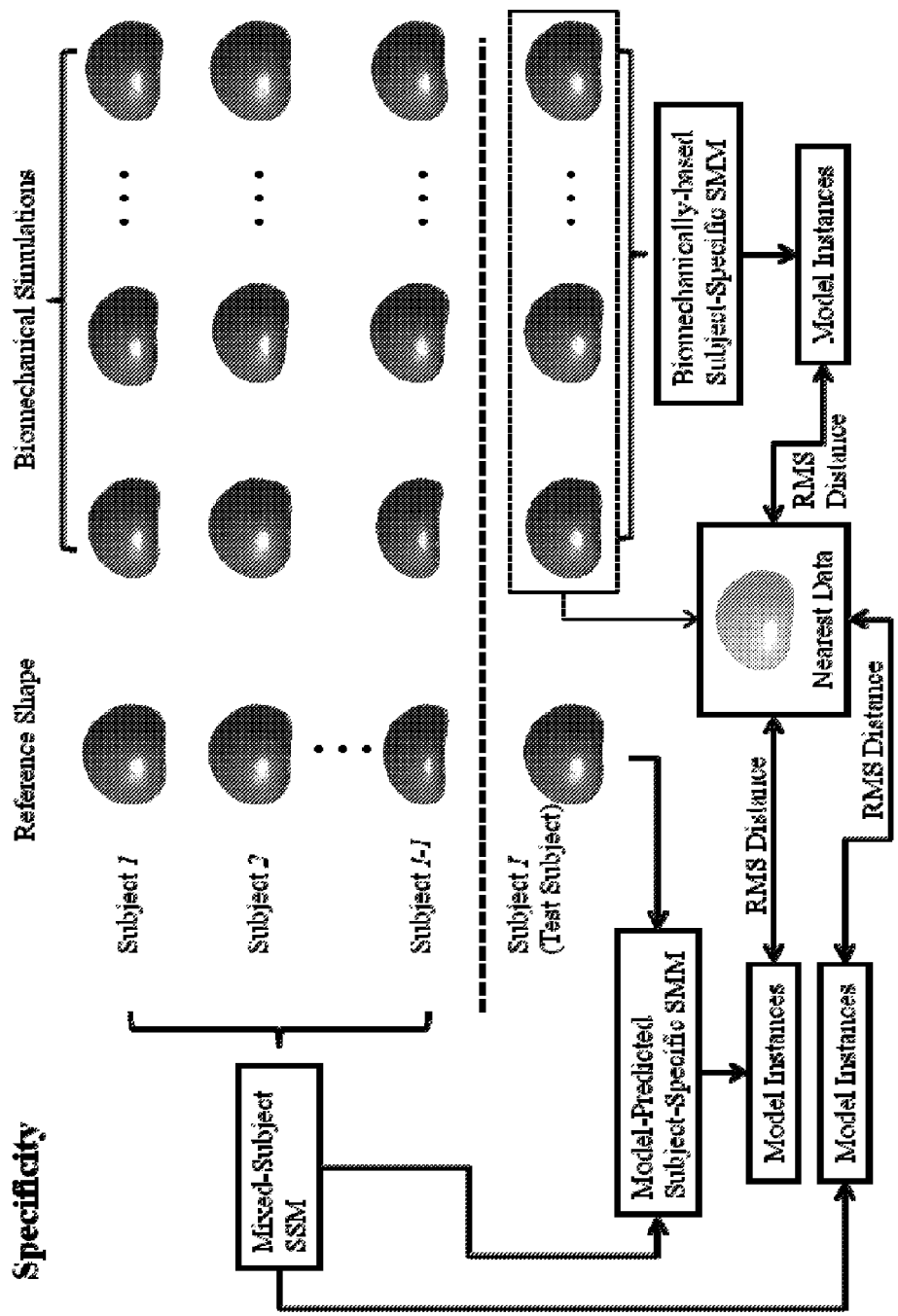
FIGS. 5 and 6 provide a schematic overview of the main leave-one-out method for a chosen test subject, as part of a validation of a method in accordance with some embodiments of the invention.
Figure 6:
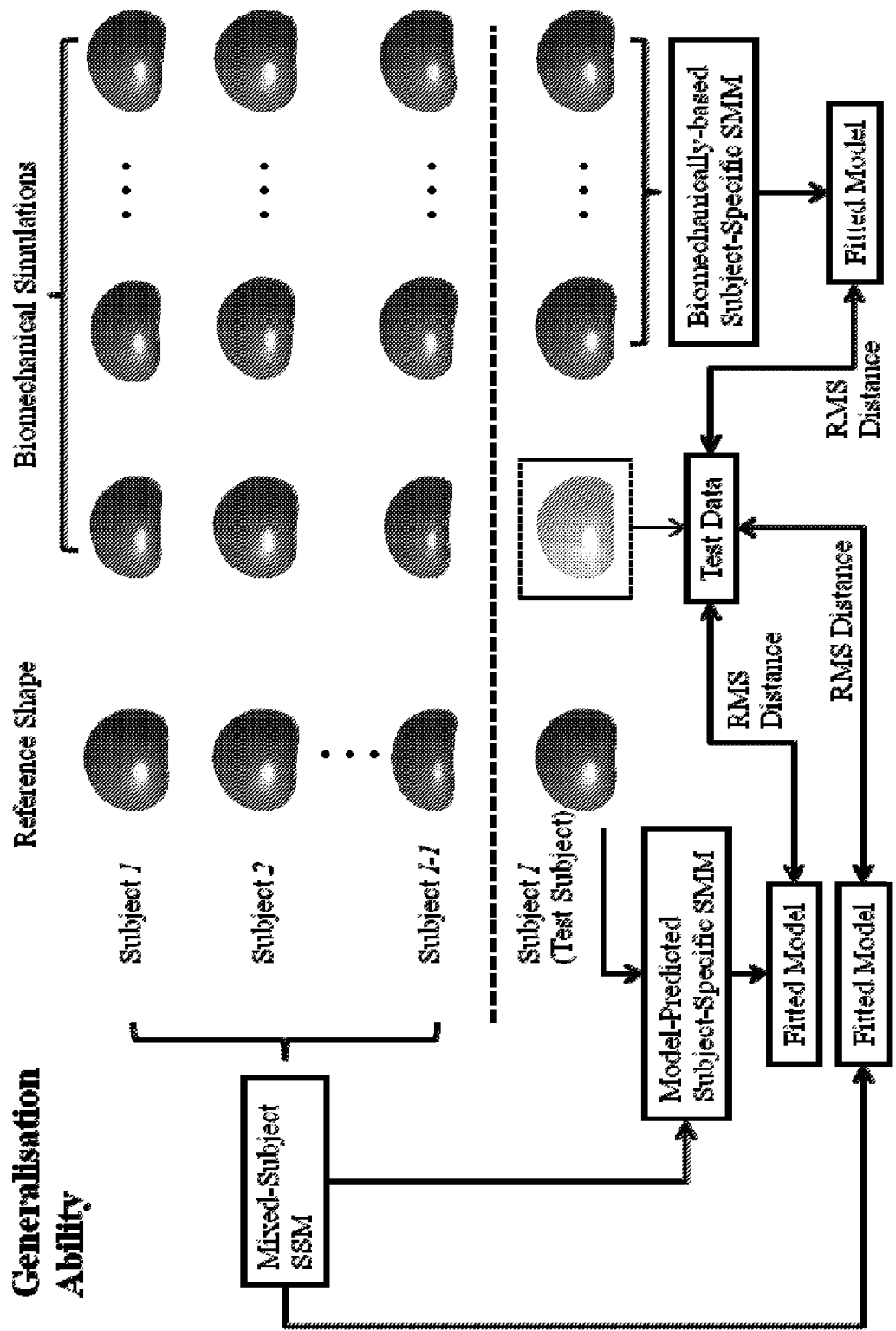

FIGS. 5 and 6 illustrate the leave-one-out method for a chosen test subject, where the three linear models are constructed independently. The root-mean-square (RMS)-distance-based generalisation ability and specificity then can be computed for each test subject, as per FIGS. 5 and 6 respectively. The cross-validation method described below provides an overall assessment of the modelling ability. Low RMS distance indicates strong generalisation ability and specificity for the linear model.

The generalisation ability of a linear model, as shown in FIG. 5, quantifies the ability of the model to describe unseen data, and therefore relates closely to a common application of such models, namely capturing organ motion to provide prior information for registering to unseen data. The generalisation ability was measured by a separate, embedded leave-one-out scheme [17]. The generalisation ability was defined as the RMS Euclidean distance between the mesh nodes of an unseen test dataset and the corresponding nodes of the instantiated model fitted to the test data (i.e. the fitted model). In particular, the RMS-distance-based generalisation ability is given by:

$$RMS_{gen} = \sqrt{\frac{1}{N}(s_{test} - s_{fitted})^T(s_{test} - s_{fitted})} \quad (12)$$

where N is the number of the mesh nodes of each model, $s_{test}$ and $s_{fitted}$ are the shape vectors (as defined above) of unseen test data and the instantiated model, respectively. As described herein, the unseen test data was the remaining (left-out) data of the 100 biomechanical simulations of the test subject, in the embedded leave-one-out scheme. The biomechanically-based SMM was then built independently using the remaining 99 simulations, as illustrated in FIG. 5. The generalisation abilities were computed for the three linear models as mentioned above (subject-specific SMM, biomechanically based SMM, and mixed-subject SSM), all based on the subject-level leave-one-out scheme.

In order to avoid bias, the experiments illustrated in FIGS. 5 and 6 to validate the linear models adopted a different leave-one-out scheme compared with that used for the estimation of the optimal kernel parameter (as described above). In the validation experiments, each of the 36 model-predicted subject-specific SMMs was tested using a mixed-subject SSM generated from the remaining 35 training datasets. Among these, 34 subjects were used as training data to compute the regression error for the remaining datasets in order to determine the optimal kernel parameter for the regression.

The specificity of each linear model was also computed using the same cross-validation framework, which is similar to the approach adopted in [17]. This measure indicates the degree to which the deformations of a linear model are constrained, which is relevant because it is desirable for the model to be robust to corrupted data, for instance, due to image artefacts or noise. Furthermore, the model should be able to predict missing data. For the purposes of this study, as illustrated in FIG. 6, this measure was defined as the RMS distance between each randomly sampled model instance $s_{instance}$ and the nearest data $s_{nearest}$ found in the training data (i.e. the 100 biomechanical simulations), as follows:

$$RMS_{spc} = \sqrt{\frac{1}{N}(s_{instance} - s_{nearest})^T(s_{instance} - s_{nearest})} \quad (13)$$

For each test subject, one thousand deformed prostate glands for each linear model were generated by randomly sampling b from $P(\mathcal{B}_w)$, $P(\mathcal{B}_i)$ and $P(\mathcal{B}_g)$ (for each of the three models respectively). The instances generated using each linear model form a set that defines the respective model space. The distance to the nearest training data from the random instance measures the specificity of the linear model.

3) SMM-based Registration Validation—the approach described herein provides a technique for generating a subject-specific SMM using synthesised training data. The ability of such models to recover actual patient organ motion in real-world applications, such as non-rigid image registration, has been tested. In particular, the accuracy of registering a deformable, model-predicted subject-specific SMM, which is based on MR-derived prostate geometry data, to 3D TRUS images was investigated by quantifying the target registration error (TRE) in the alignment of manually-identified, independent anatomical landmarks for 8 patient datasets following registration using the method described in [12]. The data for these 8 patients was independent of the training data used to build the predictive model. This TRE provides an independent measure of the registration performance that can be compared directly with registrations that make use of SMMs that were built using biomechanical simulations of the prostate motion for each patient.

Results

Figure 7:
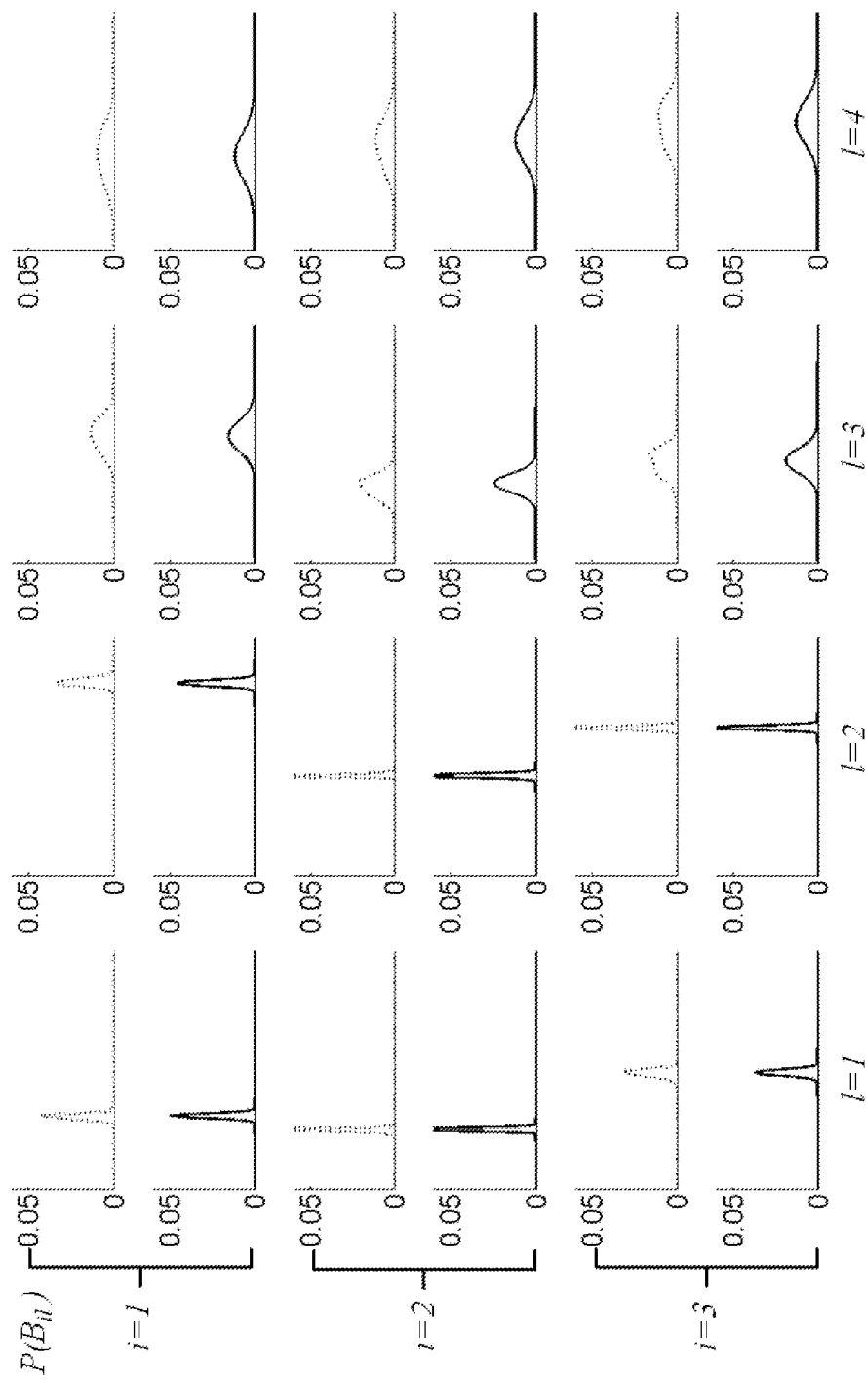
FIG. 7 compares, for three test subjects, plots obtained using a regression model to provide a predicted subject-specific probability density function (solid line), compared with a histogram constructed using original data samples (dotted line).

FIG. 7 shows example plots of the factorised $P(B_{ij})$ for the first four predicted SSPDFs for three new test subjects (solid line bottom plot), compared with the histogram constructed using the original $\{b_{ij}\}$ (dotted line—top plot). It can be seen that the corresponding curves show excellent agreement between the dotted lines representing $P(B_{ij})$ of the data used in this study and the solid lines representing the regression-estimated subject-specific probability density curves for the first four principal components for the three patients. The goodness-of-fit between the corresponding curves was evaluated using the $X^2$ test. The result—an average p>0.78—indicates excellent agreement, which provides justification for the effectiveness of the kernel regression analysis and the choice of the Gaussian form to model the PDFs in this study.

Figure 8:
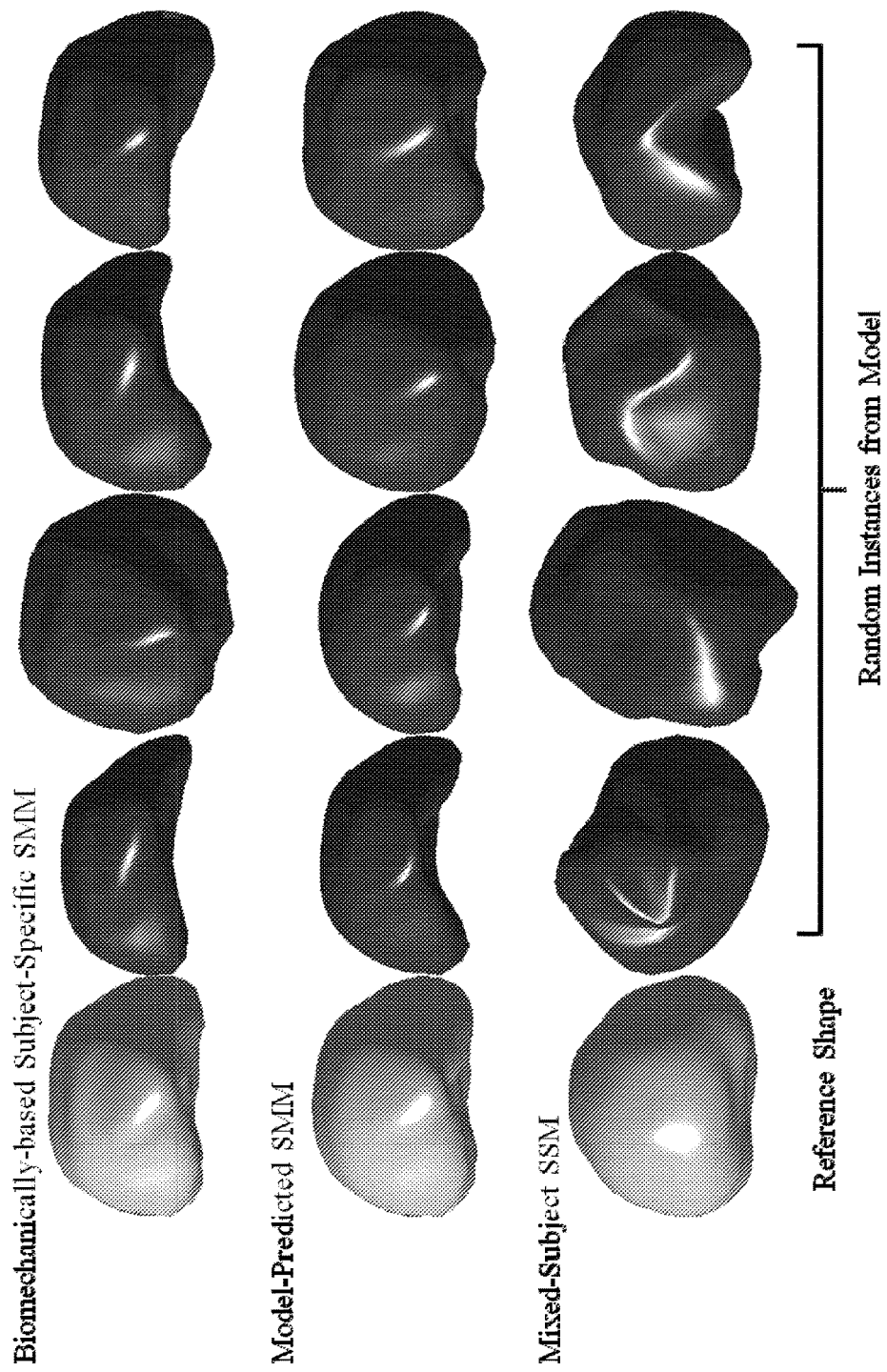
FIG. 8 shows examples of random shape instances generated using (i) the ground-truth biomechanically-based SMM, (ii) the model-predicted subject-specific SMM of a prostate for the same subject in accordance with some embodiments of the invention, and (iii) the mixed-subject SSM, which captures the shape variation over the training population of 36 patient prostates.

FIG. 8 shows examples of random shape instances generated using (i) the biomechanically-based SMM (the ground-truth), (ii) the model-predicted subject-specific SMM of a prostate for the same subject, and (iii) the mixed-subject SSM (which captures the shape variation over the training population of 36 patient prostates). More particularly, the top row of FIG. 8 comprises randomly sampled prostate glands from the ground-truth biomechanically-based SMM of a test subject (as in the leave-one-out validation); the middle row comprises randomly selected samples from the model-predicted subject-specific SMM, which are constructed from data excluding the test subject; and the bottom row comprises randomly selected samples from the mixed subject SSM, which includes both intra- and inter-subject shape variations in the training data. The first column of FIG. 8 shows the reference shape from each model.

By comparing the general form of the shapes generated using the three methods (see FIG. 8), it is visually evident that the subject-specific SMM generates shapes which look more physically realistic than those generated by the mixed-subject SSM, and are closer in appearance to those obtained from the ground-truth biomechanically-based SMM. (It should be noted that because the shape instances shown in FIG. 8 are based on random sampling, they are purely illustrative of the form of shapes generated by each SMM, and therefore should be compared groupwise, between rows, and not down each column).

Figure 9:
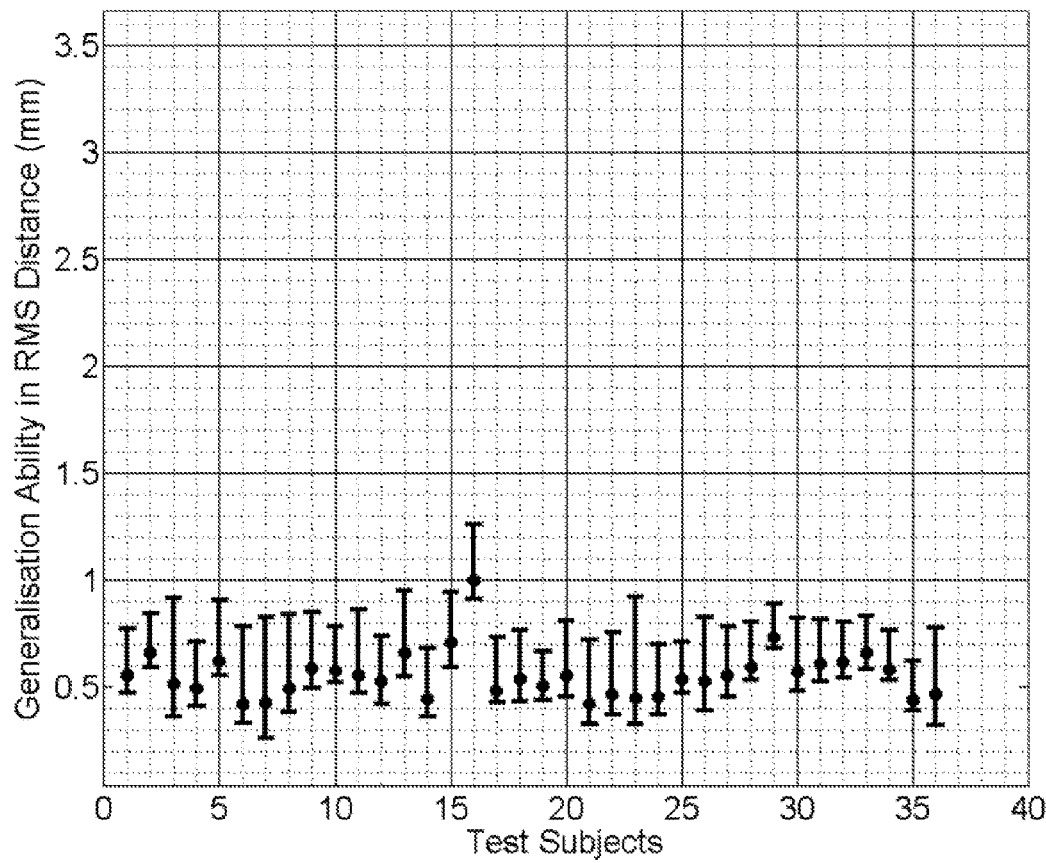
FIG. 9, FIG. 10 and FIG. 11 are plots showing the median RMS distance values for the generalisation ability of (i) the model-predicted subject-specific SMM in accordance with some embodiments of the invention, (ii) the biomechanical-based subject-specific SMM generated using the (ground truth) biomechanical simulations, and (iii) the mixed-subject SSM, respectively, for each test subject.
Figure 10:
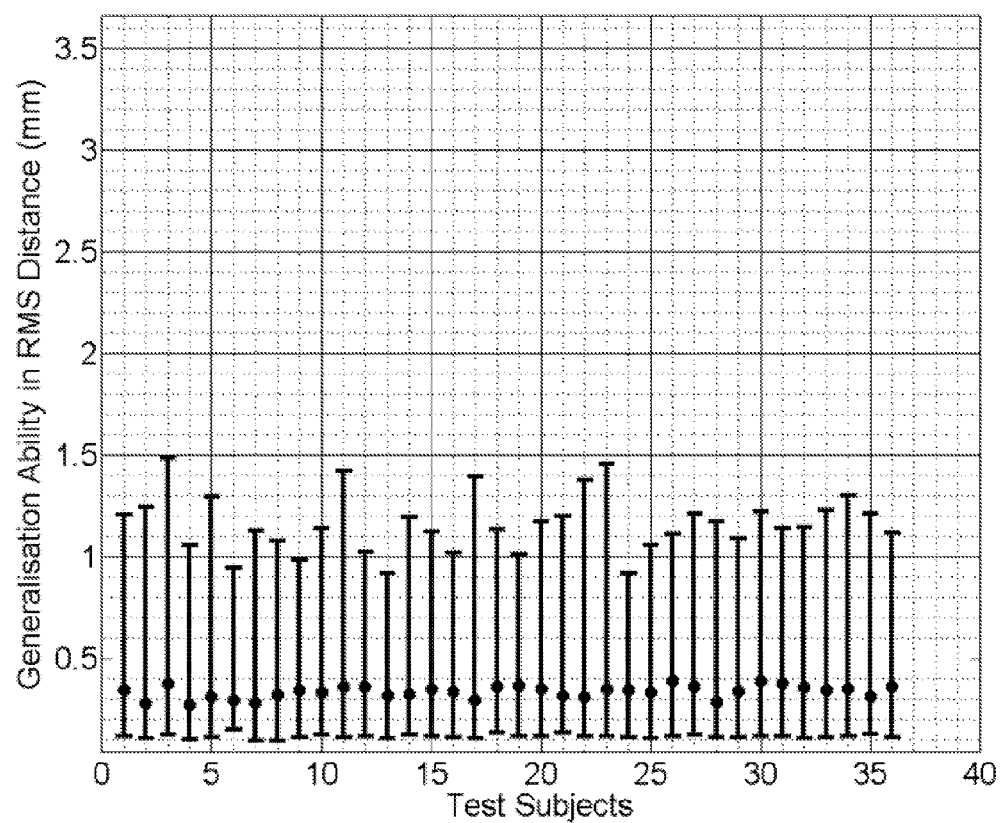
Figure 11:
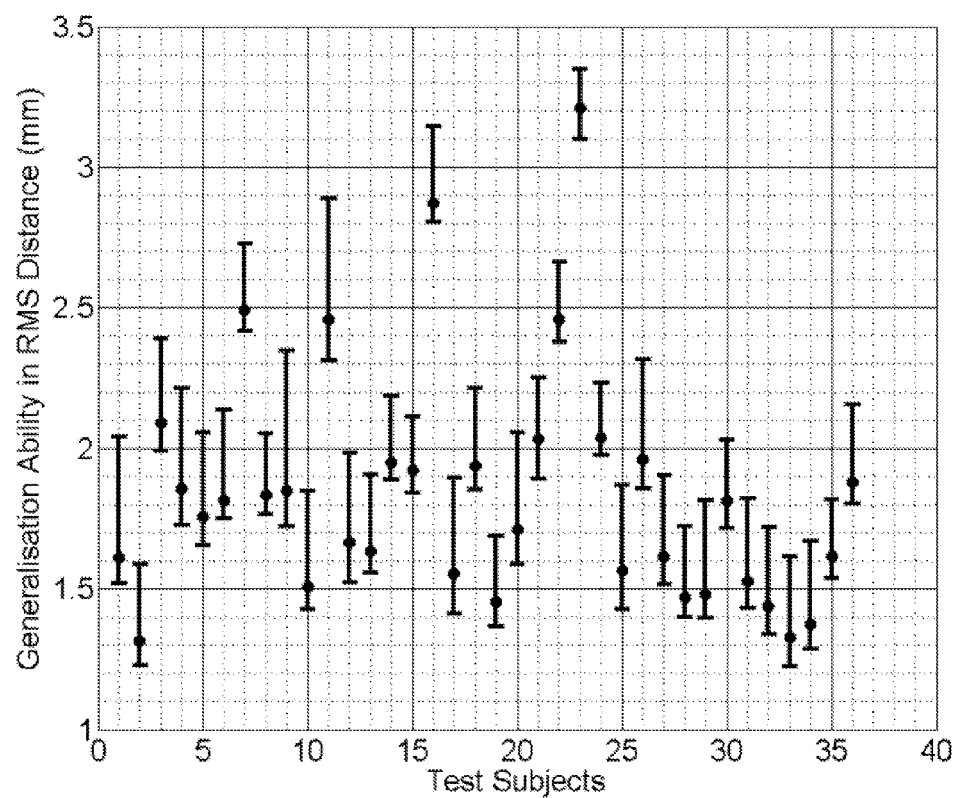

FIG. 9, FIG. 10 and FIG. 11 are plots showing the median RMS distance value for the generalisation ability of (i) the model-predicted, subject-specific SMM, (ii) the biomechanical-based, subject-specific SMM generated using the (ground truth) biomechanical simulations, and (iii) the mixed-subject SSM, respectively, for each test subject. The error bars indicate the 5th/95th percentiles of these RMS distances. From inspection of these plots, it can be seen that the two subject-specific SMMs provide lower RMS errors (distances) compared with the mixed-subject SSM. At a confidence level of 0.05, paired Kolgomorov-Smirnov tests confirm that 1) the mixed-subject SSM has significantly worse generalisation ability than the model-predicted SMM and the biomechanically-based SMM, both with $p<0.0001$; and 2) the difference in generalisation ability between the model-predicted SMM and the biomechanically-based SMM is not significantly larger than 0.1 mm ($p<0.0001$). Therefore, the proposed model-predicted SMM has a generalisation ability for unseen data which is comparable with that of the original biomechanically-based SMM, while both of these subject-specific models outperform the mixed-subject SSM in this regard (i.e. for generalisation ability).

Figure 12:
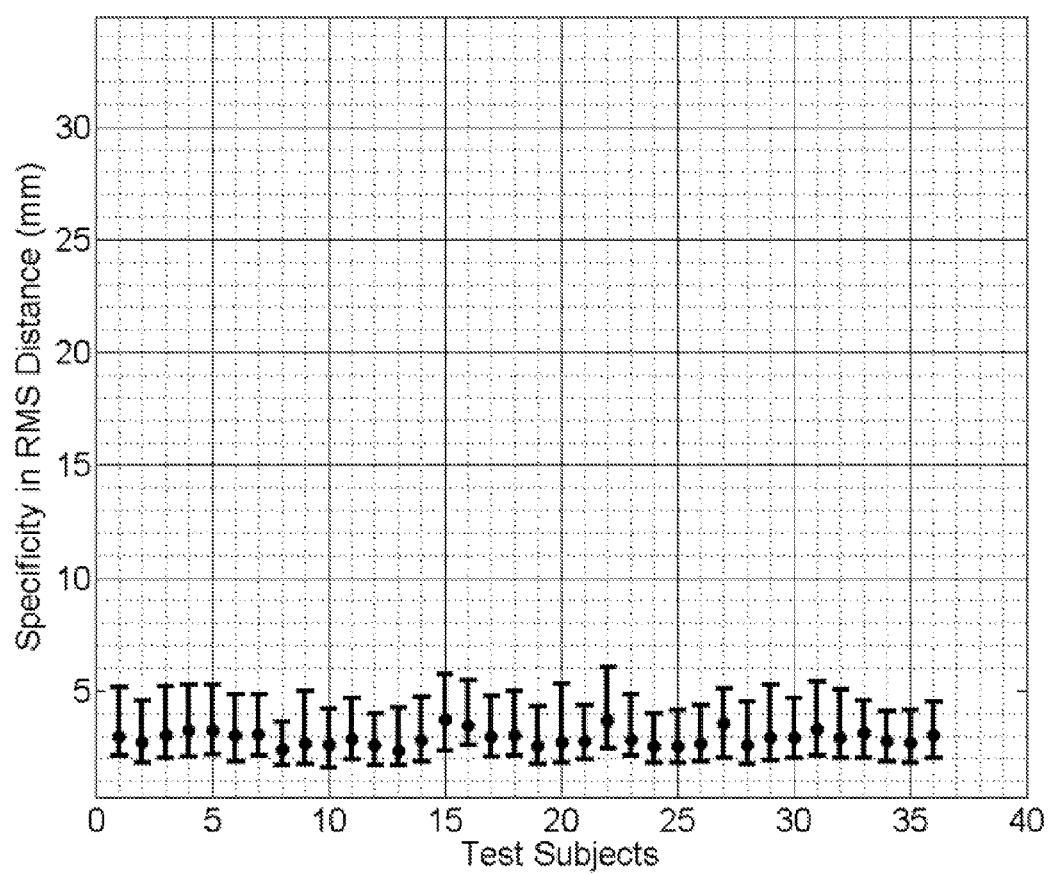
FIG. 12, FIG. 13 and FIG. 14 are plots showing the median RMS distance values of the specificities of the three linear models, namely (i) the model-predicted subject-specific SMM in accordance with some embodiments of the invention, (ii) the biomechanical-based subject-specific SMM generated using the (ground truth) biomechanical simulations, and (iii) the mixed-subject SSM, respectively, for each test subject.
Figure 13:
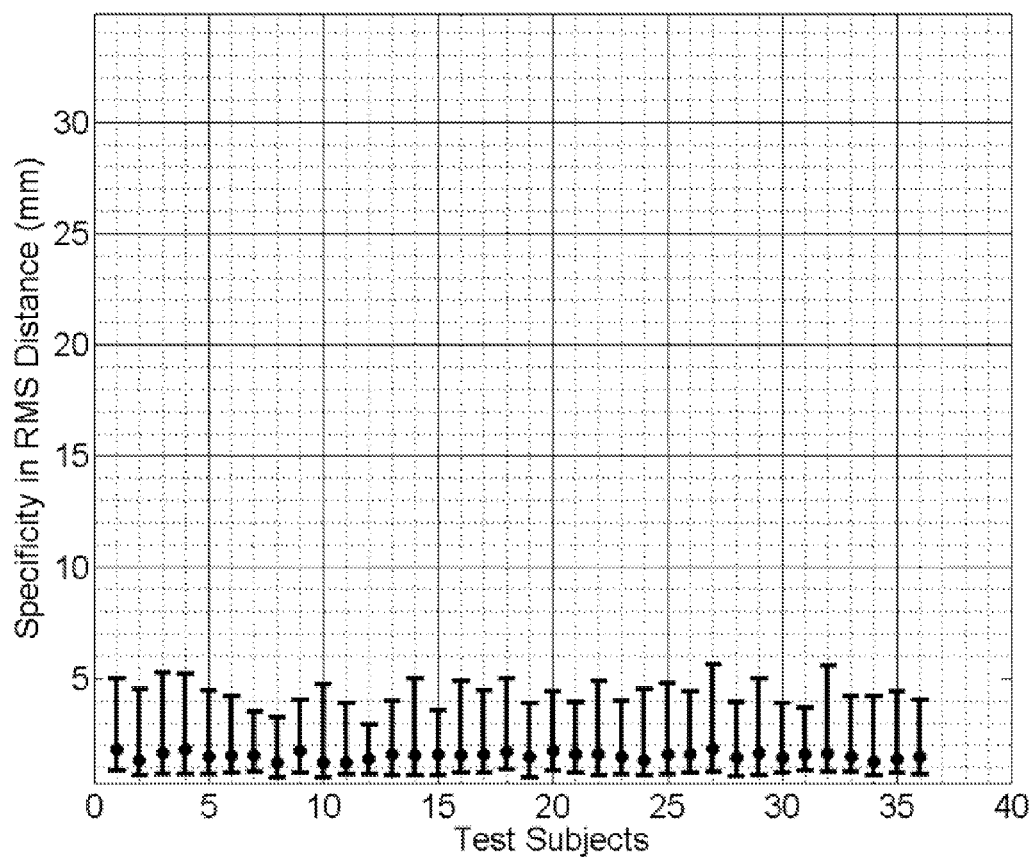
Figure 14:
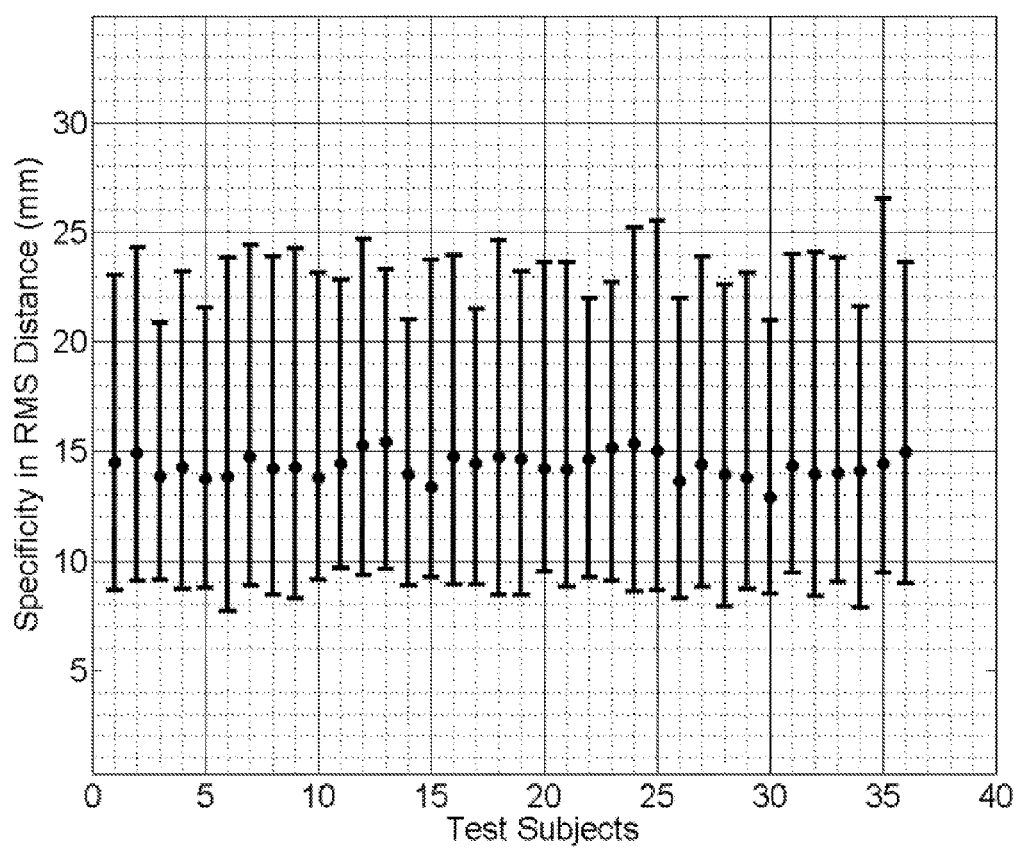

FIG. 12, FIG. 13 and FIG. 14 are plots showing the median RMS distance values of the specificities of the same three linear models, namely (i) the model-predicted subject-specific SMM, (ii) the biomechanical-based subject-specific SMM generated using the (ground truth) biomechanical simulations, and (iii) the mixed-subject SSM, respectively, for each test subject. Again, the error bars indicate the 5th/95th percentiles of these RMS distances. Comparing FIG. 12, FIG. 13 and FIG. 14 reveals that the subject-specific SMMs provide significantly smaller (better) RMS-distance-based specificities. The same paired Kolgomorov-Smirnov statistical test concludes that the difference in specificity between the mixed-subject SSM and either of the other two subject-specific SMMs is significantly larger than 10 mm, with $p<0.0001$. However, the difference between the two subject-specific SMMs is not greater than 1 mm ($p=0.0005$). These results indicate that, compared to the subject-specific SMMs, the ability of the mixed-subject SSM to generate accurate subject-specific data is poor. Furthermore, compared to the biomechanically-based SMM, the proposed model-predicted SMM provides analogous modelling ability in terms of generating subject-specific instances.

The TRE results using the approach described herein for generating subject-specific SMMs are summarised in Table 1 below, along with published TRE data [12] obtained by registering biomechanically-based subject-specific SMMs. With a confidence level set to 0.05, a paired Kolmogorov-Smirnov test indicates that there is no significant difference between the TREs obtained using these two methods ($p<0.0001$). This suggests that the approach described herein for generating subject-specific SMMs provides a viable (and computationally much easier) alternative to conventional modelling methods that require subject-specific training data without compromising registration accuracy.

TABLE 1

Summary of Registration TREs using predicted SSMMs and SMMs

| Summary Stats | Case No. | 1 | 2 | 3 | 4 | 5 | 6 | 7 | 8 | All |
|---|---|---|---|---|---|---|---|---|---|---|
| Median (95% percentile) | Start | 9.42 (11.39) | 14.52 (17.43) | 6.29 (9.62) | 6.25 (9.42) | 9.32 (11.14) | 5.86 (8.75) | 8.84 (11.65) | 6.15 (8.98) | 8.13 (15.02) |
| | Model-predicted, subject-specific SMM | 2.88 (7.94) | 3.95 (10.75) | 1.79 (6.86) | 1.98 (4.99) | 2.81 (7.16) | 1.90 (6.09) | 2.79 (9.26) | 1.92 (5.65) | 2.40 (6.19) |
| | Biomechanically-based subject-specific SMM | 2.68 (7.21) | 3.19 (9.62) | 1.69 (5.38) | 1.56 (5.21) | 2.60 (6.84) | 1.58 (4.65) | 2.92 (7.49) | 1.49 (4.66) | 2.42 (7.15) |

Discussion

This approach described herein provides a new framework for modelling subject-specific organ motion, in which learnt statistics from a training population are used to predict subject-specific training data for an unseen patient, rather than requiring those data to be provided either by dynamic imaging or computer simulation. The disclosed method allows subject-specific organ motion to be modelled implicitly, without knowing the explicit motion correspondence between data sets from different individuals.

The motion modelling method described herein has been compared with biomechanical modelling as a means of generating subject-specific synthetic training data (rather than using dynamic imaging). One advantage of using biomechanical simulations is that the point correspondences between successive shapes of the organ of a particular subject are known implicitly, since these are computed relative to a common reference shape. On the other hand, a significant advantage of the approach described herein is that, since the method is based on modelling SSPDF and kernel regression analysis, only limited subject-specific data on organ shape change during motion is required. Consequently, the method is computationally efficient and highly suited to applications where comprehensive data on organ motion are difficult or impossible to acquire, for example during a surgical intervention. Furthermore, the approach disclosed herein is also helpful in situations where imaging is feasible but has significant practical constraints (for example, limited frame rate), meaning that that only a small number of training shape instances may be obtained. Moreover, the use of just a single reference shape for unseen subjects overcomes practical constraints that are commonly encountered in the clinical setting, since the reference image can be obtained from diagnostic or planning images, which are widely available in the clinical setting (as in the example provided herein).

Although the approach described herein has primarily used subject-specific SMMs to describe the motion of the prostate gland alone, the approach is also applicable to other organs as appropriate, including multi-organ motion. Furthermore, the approach may be easily adapted to use an arbitrary probability function, such as a mixture model if multi-modal distribution is observed, or a different regression technique. Although such adaptations would not result in a straightforward linear model directly, random samples of the subject-specific organ shape could then be drawn from the learnt SSPDF, e.g. via a Monte Carlo approach, and then used to build a linear SMM using standard SSM techniques.

Figure 15:
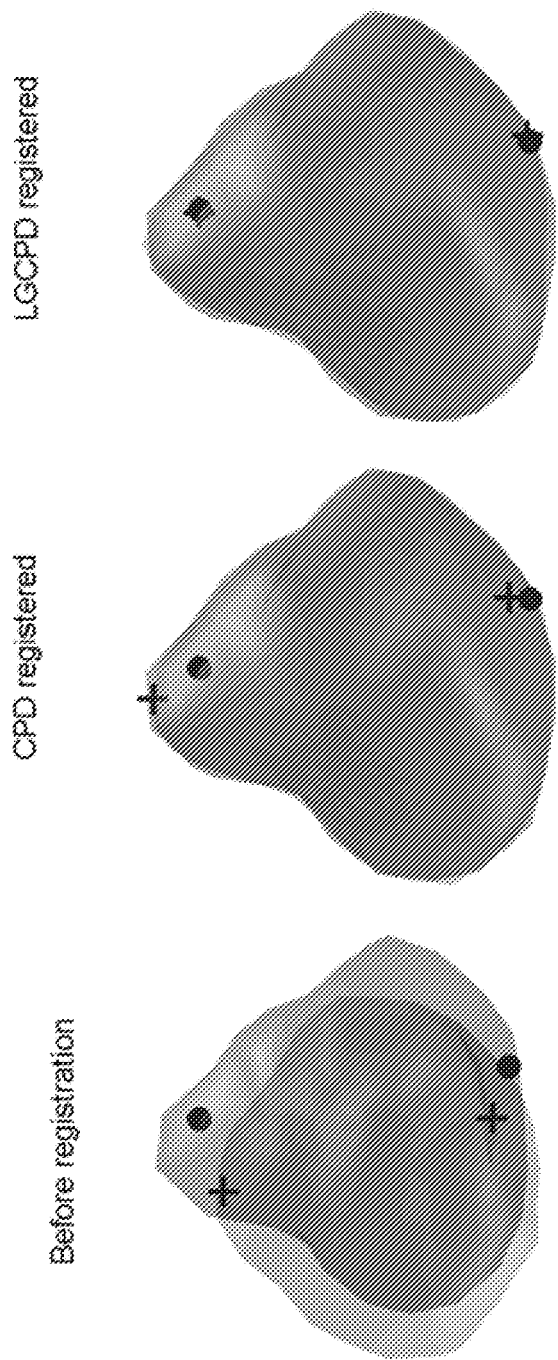
FIG. 15 shows a pair-wise example of registration of prostate surfaces and anatomical landmarks.

In addition, the approach described herein supports the use of group- and pair-wise landmark-guided coherent point drift (LGCPD) algorithms to non-rigidly register training shapes. FIG. 15 shows a pair-wise example of such registration, in particular, an example of pair-wise registration of prostate surfaces and anatomical landmarks (apex and base) using the original coherent point drift (CPD) and LGCPD algorithms. It can be seen that the landmarks are better aligned (right) after using the LGCPD algorithm, compared with using the CPD algorithm (middle). Accordingly, the approach described herein provides a faster and more robust extension to general-purpose CPD.

(For further information about CPD, please see: Myronenko, A.; Xubo Song, "Point Set Registration: Coherent Point Drift," *Pattern Analysis and Machine Intelligence, IEEE Transactions on*, vol. 32, no. 12, pp. 2262, 2275, December 2010, doi: 10.1109/TPAMI.2010.46; for further information on LGCPD, please see: Hu, Y., Rijkhorst, E. J., Manber, R., Hawkes, D. J., Barratt, D. C. (2010), "Deformable Vessel-Based Registration Using Landmark-Guided Coherent Point Drift". *MIAR*. (Vol. 6326 pp. 60-69). Springer LNCS).

Referring back to Eq. (1), the value of L in Eq. (1) may be chosen so that the reference SSM covers of a certain percentage of the cumulative variance (e.g. at least 99%) in the training data. The approach described herein may provide an alternative method to determine an optimal value of L, as components with decreasing variance may contain too much noise to be reasonably modelled by Gaussian or captured by kernel regression.

In the implementations described above, multiple subject-specific images are generated using a biomechanical model to deform a single reference image for a given subject. However, the multiple subject-specific images may be acquired via other techniques, including: (i) acquiring a "video" of the subject, i.e. a relatively rapid succession of images frames (2-D or 3-D); or (ii) acquiring multiple (still) images of the subject over a period of time. Note that with the latter technique, changes in organ shape over time may reflect processes other than motion/deformation (e.g. growth or decay) it may or may not be beneficial for such processes to be incorporated into the model, depending on the details of the desired application. In addition, the multiple subject-specific images for any given subject may be acquired from two or more different techniques (such as using both biomechanical modelling and video data), and different techniques (or combinations of techniques) may be used for different subjects. As mentioned above, the use of a biomechanical model to deform a single reference image for a given subject has the advantage that once the point correspondence has been determined for the reference image, this can then be automatically preserved through the biomechanically modelling for the other images obtained thereby. Similarly, for video data, once a point correspondence has been determined for one image (image frame) in the video, then it is generally feasible to preserve the point correspondence through difference frames on an automated or semi-automated basis, such as by determining motion vectors from one image frame to the next.

The approach described herein significantly reduces the time required to build a subject-specific SMM, which is important in many applications, such as modelling prostate motion to enable deformable registration of preoperative MR images to intraoperative TRUS images. In particular, approach described herein reduces the computational time to both constrain the registration and predict tissue displacements inside the prostate, given surface displacements, from a few hours using a GPU-based FE simulator to a just few seconds without compromising registration accuracy. Another potential application of the method disclosed herein is to decompose a conventional SSM using any subject-specific measurements, if available, to provide better modelling ability.

The approach described herein can be used in many different contexts. For example, given a reference image of an organ for a specific subject (patient), the model might be used, inter alia, to segment the organ from a second image or to perform an image registration between the second image and the reference image (so that the corresponding positions in the reference and second images for a specific location on or in the organ are determined).

Other potential applications include subject identification, such as in the context of facial recognition, where there are multiple subjects, each having a respective reference image, and it is to be determined whether or not a newly acquired image matches one of these reference images (and if so, which one). In this context, the subject-specific SMM may be used to try to map (register) each reference image to the newly acquired image, and a match is determined for a given reference image if such registration is successful (statistically plausible) within the parameters of the SMM.

The above embodiments involving various data (signal) processing may be performed by specialised hardware, by general purpose hardware running appropriate computer code, or by some combination of the two. For example, the general purpose hardware may comprise a personal computer, a computer workstation, etc. The computer code may comprise computer program instructions that are executed by one or more processors to perform the desired operations. The one or more processors may be located in or integrated into special purpose apparatus, such as a medical imaging system (MRI, ultrasound, etc). The one or more processors may comprise digital signal processors, graphics processing units, central processing units, or any other suitable device. The computer program code is generally stored in a non-transitory medium such as an optical disk, flash memory (ROM), or hard drive, and then loaded into random access memory (RAM) prior to access by the one or more processors for execution.

In conclusion, the skilled person will be aware of various modifications that can be made to the above embodiments to reflect the particular circumstances of any given implementation. Moreover, the skilled person will be aware that features from different embodiments can be combined as appropriate in any given implementation. Accordingly, the scope of the present invention is defined by the appended claims and their equivalents.

REFERENCES

[1] Heimann, T. & Meinzer, H. P. 2009, "Statistical shape models for 3D medical image segmentation: a review", *Med. Image Anal.*, vol. 13, no. 4, pp. 543-563.

[2] Barratt, D. C., Chan, C. S. K., Edwards, P. J., Penney, G. P., Slomczykowski, M., Carter, T. J., & Hawkes, D. J. 2008, "Instantiation and registration of statistical shape models of the femur and pelvis using 3D ultrasound imaging", *Medical Image Analysis*, vol. 12, no. 3, pp. 358-374.

[3] Cootes, T. F., Taylor, C. J., Cooper, D. H., & Graham, J. 1995, "Active Shape Models—Their Training and Application", *Computer Vision and Image Understanding*, vol. 61, no. 1, pp. 38-59.

[4] Mohamed, A., Davatzikos, C., & Taylor, R. 2002, "A Combined Statistical and Biomechanical Model for Estimation of Intra-operative Prostate Deformation," in *Medical Image Computing and Computer-Assisted Intervention—MICCAI* 2002, LNCS 2489 edn, pp. 452-460.

[5] Hu, Y., Carter, T., Ahmed, H., Emberton, M., Allen, C., Hawkes, D., & Barratt, D. 2011, "Modelling Prostate Motion for Data Fusion during Image-guided Interventions", *Medical Imaging, IEEE Transactions on*, vol. 30, no. 11, pp. 1887-1900.

[6] Hu, Y., Morgan, D., Ahmed, H. U., Pendse, D., Sahu, M., Allen, C., Emberton, M., & Hawkes, D. &. B. D. 2008b, "A Statistical Motion Model based on Biomechanical Simulations for Data Fusion during Image-guided Prostate Interventions," in *MICCAI* 2008, LNCS 5241 edn, Springer, pp. 737-744.

[7] Ehrhardt, J., Werner, R., Schmidt-Richberg A., & Handels, H., 2010, "A statistical shape and motion model for the prediction of respiratory lung motion", *SPIE Medical Imaging* 2010: Image Processing, vol. 7623, pp. 531-539.

[8] Wang, Y. & Staib, L. H. 2000, "Physical model-based non-rigid registration incorporating statistical shape information", *Medical. Image Analysis.*, vol. 4, no. 1, pp. 7-20.

[9] Vasilescu, M. A. O. and Terzopoulos, D., 2002, "Multilinear Analysis of Image Ensembles: TensorFaces." in ECCV2002, Vol. LNCS 2350, pp. 447-460.

[10] Zhu, Y., Papademetris, X., Sinusas, A. J. and Duncan, J. S.: "Bidirectional Segmentation of Three-Dimensional Cardiac MR Images Using a Subject-Specific Dynamical Model." 2008, in MICCAI2008, LNCS 5242, 450-457.

[11] Grbic, S., Ionasec, R., Vitanovski, D., Voigt, I., Wang, Y., Georgescu, B., Navab, N. and Comaniciu, D.: "Complete Valvular Heart Apparatus Model from 4D Cardiac CT." 2006, in MICCAI2010, LNCS 6361, 218-226.

[12] Hu, Y., Ahmed, H. U., Taylor, Z., Allen, C., Emberton, M., Hawkes, D., & Barratt, D. 2012, "MR to ultrasound registration for image-guided prostate interventions", *Medical Image Analysis*, vol. 16, no. 3, pp. 687-703.

[13] Shlens, J. A Tutorial on Principal Component Analysis. 2009. www.snl.salk.edu/~shlens/pca.pdf, Ver. 3.01

[14] Hastie, T., Tibshirani, R., and Friedman, J., 2009. "The Elements of Statistical Learning: data mining, inference and prediction." 2nd ed., Springer.

[15] Hu, Y., Rijkhorst, E.-J., Manber, R., Hawkes, D., & Barratt, D. 2010, "Deformable vessel-based registration using landmark-guided coherent point drift," in *MIAR'10 Proceedings of the 5th international conference on Medical imaging and augmented reality*, vol. 6326 Springer, Beijing, pp. 60-69.

[16] Styner, M., Rajamani, K., Nolte, L. P., Zsemlye, G., Szekely, G. Ä., Taylor, C., & Davies, R. 2003, "Evaluation of 3D Correspondence Methods for Model Building," pp. 63-75.

[17] Hu, Y., van den Boom, R., Carter, T., Taylor, Z., Hawkes, D., Ahmed, H. U., Emberton, M., Allen, C., & Barratt, D. 2010, "A comparison of the accuracy of statistical models of prostate motion trained using data from biomechanical simulations", *Progress in Biophysics and Molecular Biology*, vol. 103, no. 2-3, pp. 262-272.

What is claimed is:

1. A method for building a subject-specific statistical model of shape variation for an anatomical structure, the method comprising:
    providing a set of geometric representations of shape for said anatomical structure, wherein each representation is associated with one of multiple subjects, each subject having a respective subset of associated representations, and each subset comprising multiple representations including a reference representation, said multiple representations corresponding to different shapes of the anatomical structure arising from physical motion and/or deformation thereof, the method comprising:
    specifying a set of shape parameters whose values, for any given representation, characterise the shape of the representation;
    for each subject, representing a probability distribution of the values of the shape parameters across the subset of representations associated with that subject by a set of subject-specific distribution parameters;
    determining a regression between the subject-specific distribution parameters and the respective reference representation for each subject;
    applying said determined regression to a reference representation for a new subject to determine subject-specific distribution parameters for the new subject; and
    using the subject-specific distribution parameters to build a subject-specific statistical motion model for the new subject.

2. The method of claim 1, wherein the set of shape parameters are determined using principal component analysis.

3. The method of claim 2, further comprising:
    providing a set of shape vectors, $s_g$, where g=1, 2, ... G, wherein G is the number of representations in said set of representations, such that there is a shape vector corresponding to each representation, and wherein the principle component analysis represents each shape vector by L principle components; and
    specifying the set of shape parameters includes building a mixed-subject statistical shape model according to:

$$s_g = \bar{s} + \Sigma_{l=1}^{L} b_{gl} e_l = \bar{s} + [e_1, e_2, \ldots, e_L]$$
$$[b_{g1}, b_{g2}, \ldots, b_{gL}]^T = \bar{s} + Eb_g$$

where $\bar{s}$ is a mean shape vector; $e_l$ is an eigenvector of a covariance matrix of mean-subtracted shape vectors, wherein $e_l$ corresponds to an $l^{th}$ largest eigenvalue, $\sigma_l^2$, from the principal component analysis, and wherein the vector $b_g$ contains L shape parameter values that collectively describe the $g^{th}$ shape vector.

4. The method of claim 3, wherein the shape vectors, comprise point correspondence data for the set of representations that track spatial coordinates of a predetermined set of points through variations in shape across the set of representations.

5. The method of claim 1, wherein the probability distribution of values for one of the shape parameters in said set of shape parameters is assumed to be independent of the other shape parameters in said set of shape parameters.

6. The method of claim 5, wherein there are L shape parameters in said set of shape parameters, and representing the probability distribution ($\mathcal{B}_i$) of the values of the shape parameters for the subset of representations associated with a subject (i) is parameterised by a multivariate Gaussian probability density function $\mathcal{N}(\mathcal{B}_i; \mu_i, \sigma_i^2)$, where the distribution parameters, $\mu_i$ and $\sigma_i^2$, represent the mean vector and the diagonal entries of the L×L diagonal covariance matrix respectively, and in which the diagonal entries of the covariance matrix represent the component variance vector $\sigma_i^2 = [\sigma_{il}^2]_{l=1, 2, \ldots, L}^T$.

7. The method of claim 6, wherein the distribution parameters for a given subject (i), namely $\mu_i$ and $\sigma_i^2$, are estimated given a set of samples $\{b_{ij}, j=1, 2, \ldots, J_i\}$ using the following maximum likelihood estimators:

$$\hat{\mu}_i = \frac{1}{J_i} \sum_{j=1}^{J_i} b_{ij} \quad (3)$$

and $$\hat{\sigma}_i^2 = \frac{1}{J_i - 1} \sum_{j=1}^{J_i} (b_{ij} - \hat{\mu}_i)^2 \quad (4)$$

where $J_i$ represents the number of representations in the subset for subject i, and the vector $b_{ij}$ contains L shape parameter values that collectively describe the $j^{th}$ shape vector for subject i.

8. The method of claim 1, wherein each distribution parameter is expressed as a linear function of kernels.

9. The method of claim 1, wherein the regression is determined by a linear least squares technique.

10. The method of claim 1, wherein specifying a set of shape parameters, whose values for any given representation characterise the shape of the representation, includes building a mixed-subject statistical shape model according to:

$$s_g = \bar{s} + \sum_{l=1}^{L} b_{gl} e_l = \bar{s} + [e_1, e_2, \ldots, e_L][b_{g1}, b_{g2}, \ldots, b_{gL}]^T = \bar{s} + Eb_g$$

where $\bar{s}$ is a mean shape vector; $e_l$ is an eigenvector of a covariance matrix of mean-subtracted shape vectors, wherein $e_l$ corresponds to an $l^{th}$ largest eigenvalue, $\sigma_l^2$, from the principal component analysis, and wherein the vector $b_g$ contains L shape parameter values that collectively describe the $g^{th}$ shape vector; and wherein the subject-specific SMM takes the form:

$$s_{predict} = \bar{s} + E\mu_{new} + Eb_{new} \quad (11)$$

wherein $\bar{s} + E\mu_{new}$ is equivalent to the mean of the predicted subject-specific SMM, $E\mu_{new}$ being a bias term in which $\mu_{new}$ represents a mean value of a distribution parameter as predicted by said regression and $b_{new}$ represents the new shape parameters.

11. The method of claim 1, wherein the anatomical structure comprises an organ formed of soft tissue, and the variations in shape comprise deformation or movement of the organ.

12. The method of claim 11, wherein the reference representation describes an organ in its resting or un-deformed state.

13. The method of claim 11, wherein the reference representation describes an organ at a time corresponding to a particular physiological event.

14. The method of claim 1, wherein at least one of the representations comprises an image.

15. The method of claim 1, wherein at least one of the representations is derived from a biomechanical model.

16. The method of claim 1, further comprising using anatomical landmarks on said anatomical structure to provide point correspondence data for the set of representations, wherein the point correspondence data are used to track spatial coordinates of a predetermined set of points through variations in shape across the set of representations.

17. The method of claim 16, wherein the point correspondence data is determined by performing an image registration between the reference representations for the different subjects.

18. The method of claim 1, further comprising using the subject-specific statistical motion model for the new subject for image registration.

19. The method of claim 1, further comprising using the subject-specific statistical motion model for the new subject for image segmentation.

20. The method of claim 18, wherein the image registration or image segmentation is used to support an image-assisted medical intervention.

21. A non-transitory computer-readable storage medium storing instructions that when executed by a computer cause the computer to perform a method for building a subject-specific statistical model of shape variation for an anatomical structure, the method comprising:

providing a set of geometric representations of shape for said anatomical structure, wherein each representation is associated with one of multiple subjects, each subject having a respective subset of associated representations, and each subset comprising multiple representations including a reference representation, said multiple representations corresponding to different shapes of the anatomical structure arising from physical motion and/or deformation thereof, the method comprising:

specifying a set of shape parameters whose values, for any given representation, characterise the shape of the representation;

for each subject, representing a probability distribution of the values of the shape parameters across the subset of representations associated with that subject by a set of subject-specific distribution parameters;

determining a regression between the subject-specific distribution parameters and the respective reference representation for each subject;

applying said determined regression to a reference representation for a new subject to determine subject-specific distribution parameters for the new subject; and using the subject-specific distribution parameters to build a subject-specific statistical motion model for the new subject.

22. An apparatus that builds a subject-specific statistical model of shape variation for an anatomical structure, the apparatus comprising:

a processor;

a memory that contains program instructions to be executed by the processor, the program instructions including:

instructions for providing a set of geometric representations of shape for said anatomical structure, wherein each representation is associated with one of multiple subjects, each subject having a respective subset of associated representations, and each subset comprising multiple representations including a reference representation, said multiple representations corresponding to different shapes of the anatomical structure arising from physical motion and/or deformation thereof;

instructions for specifying a set of shape parameters whose values, for any given representation, characterise the shape of the representation;

instructions that for each subject, represent a probability distribution of the values of the shape parameters across the subset of representations associated with that subject by a set of subject-specific distribution parameters;

instructions for determining a regression between the subject-specific distribution parameters and the respective reference representation for each subject;

instructions for applying said determined regression to a reference representation for a new subject to determine subject-specific distribution parameters for the new subject; and instructions for using the subject-specific distribution parameters to build a subject-specific statistical motion model for the new subject.

* * * * *